United States Patent
Subramanian et al.

(10) Patent No.: US 9,921,839 B1
(45) Date of Patent: Mar. 20, 2018

(54) COORDINATED THREAD CRITICALITY-AWARE MEMORY SCHEDULING

(71) Applicants: Lavanya Subramanian, Santa Clara, CA (US); Sreenivas Subramoney, Bangalore (IN); Nithiyanandan Bashyam, Bangalore (IN); Anant Nori, Bangalore (IN)

(72) Inventors: Lavanya Subramanian, Santa Clara, CA (US); Sreenivas Subramoney, Bangalore (IN); Nithiyanandan Bashyam, Bangalore (IN); Anant Nori, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/275,066

(22) Filed: Sep. 23, 2016

(51) Int. Cl.
    *G06F 12/12*     (2016.01)
    *G06F 9/30*      (2018.01)
    *G06F 12/0862*   (2016.01)
    *G06F 9/50*      (2006.01)
    *G06F 9/48*      (2006.01)

(52) U.S. Cl.
    CPC ........ *G06F 9/3009* (2013.01); *G06F 9/30047* (2013.01); *G06F 9/4881* (2013.01); *G06F 9/5016* (2013.01); *G06F 12/0862* (2013.01); *G06F 2212/602* (2013.01)

(58) Field of Classification Search
    CPC ............................ G06F 9/3009; G06F 12/0862
    USPC .......................................................... 711/137
    See application file for complete search history.

(56) References Cited

U.S. PATENT DOCUMENTS

2013/0336638 A1* 12/2013 Fork ................. H04N 21/2387
                                                    386/278

OTHER PUBLICATIONS

S. Ghose, H. Lee, and J. F. Martinez, Improving Memory Scheduling via Processor-Side Load Criticality Information, In ISCA, 2013.

(Continued)

*Primary Examiner* — Jae Yu
(74) *Attorney, Agent, or Firm* — Lowenstein Sandler LLP

(57) ABSTRACT

A multi-core processor includes a plurality of cores to execute a plurality of threads and to monitor metrics for each of the plurality of threads during an interval, the metrics including stall cycle values, prefetches of a first type, and prefetches of a second type. The multi-core processor further includes criticality-aware thread prioritization (CATP) logic to compute a stall fraction for each of the plurality of threads during the interval using the stall cycle values, identify a thread with a highest stall fraction of the plurality of threads, determine the highest stall fraction is greater than a stall threshold, prioritize demand requests of the identified thread, compute a prefetch accuracy of the identified thread during the interval using the prefetches of the first type and the prefetches of the second type, determine the prefetch accuracy is greater than a prefetch threshold, and prioritize prefetch requests of the identified thread.

22 Claims, 19 Drawing Sheets

(56) References Cited

OTHER PUBLICATIONS

Scott Rixner, William J. Daily, Ujval J. Kapasi, Peter Mattson, and John D. Owens. Memory access scheduling. In Proceedings of the 27th annual international symposium on Computer architecture (ISCA '00).

Ravi Iyer, Li Zhao, Fei Guo, Ramesh Illikkal, Srihari Makineni, Don Newell, Yan Solihin, Lisa Hsu, Steve Reinhardt, QoS policies and architecture for cache/memory in CMP platforms. In SIGMETRICS '07.

\* cited by examiner

COORDINATED THREAD CRITICALITY-AWARE MEMORY SCHEDULING

BACKGROUND

In a multicore system, multiple applications (e.g., threads) running on different cores share a main memory. Requests from the applications may interfere at the main memory, resulting in delays in request service and eventually, performance degradation. The queueing latency of requests to main memory increases when multiple applications are executing in a system, as compared to when a single application/thread is executing on a system. When memory requests of an application are delayed for such long times waiting for the main memory, the application could stall until the data corresponding to the request is fetched from main memory, resulting in performance degradation. Applications/threads slow down when the applications/threads are run in a multiple threaded workload along with other threads, as compared to when the thread is run alone.

DESCRIPTION OF THE EMBODIMENTS

Figure 1A:
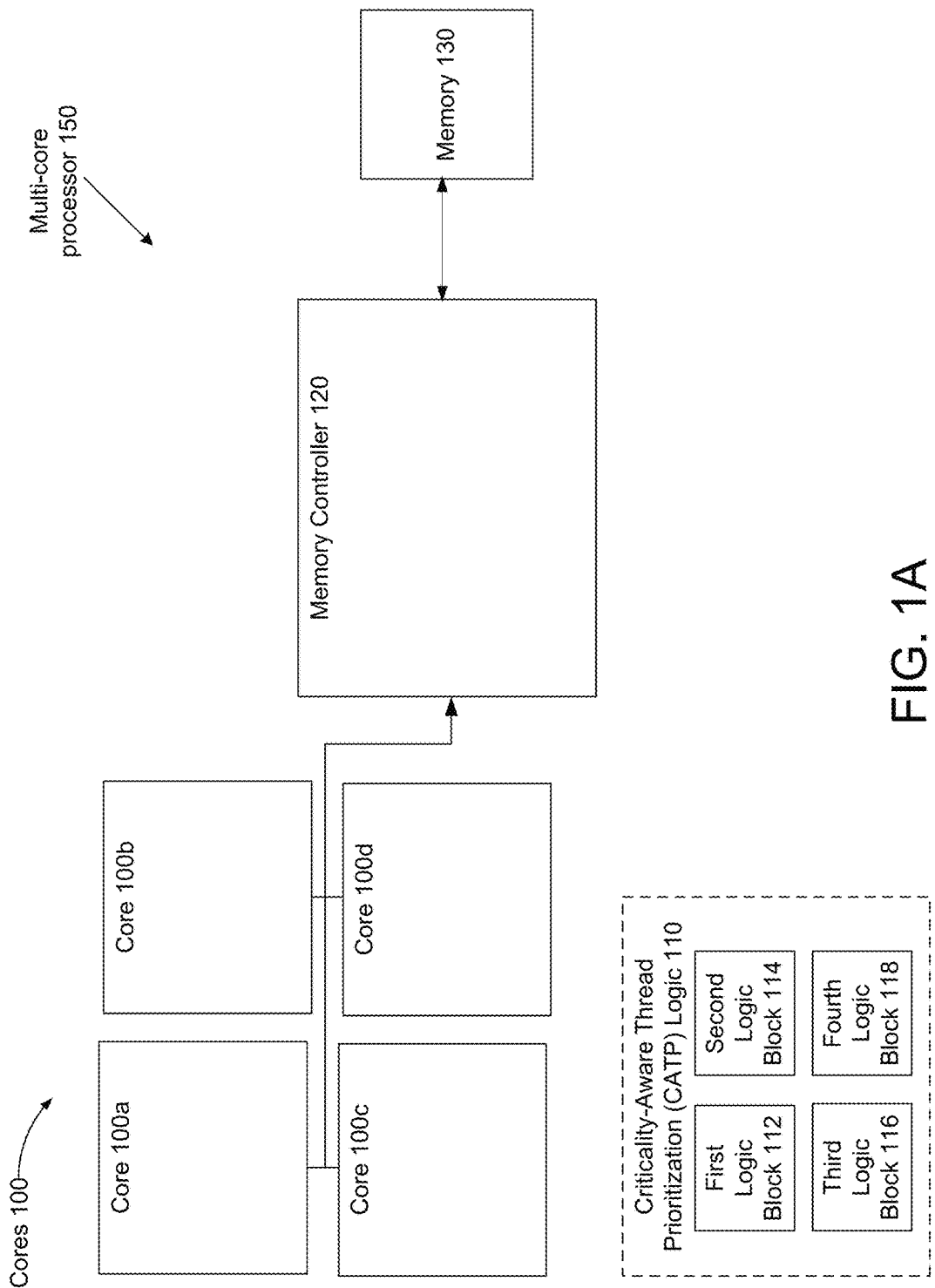
FIG. 1A illustrates a criticality-aware thread prioritization (CATP) logic in a multi-core processor, according to one embodiment.

Conventional methods attempt to overcome problems of inter-thread interference by identifying which requests are critical by monitoring which memory requests of an application have stalled the core for long periods of time in the past and prioritizing such requests at a memory controller. However, such conventional methods have major shortcomings. These conventional methods focus only on identifying and prioritizing critical demand requests and do not take into account prefetch requests and their criticality. This is a significant shortcoming since prefetch requests may constitute over 30% of the total memory traffic. In addition, the conventional methods monitor each request (e.g., 100,000 s of requests) in each thread to determine which requests are critical and prioritize the requests on a per-thread basis, adding significant hardware overhead and complexity.

Criticality-aware thread prioritization (CATP) logic, as described in various embodiments herein, presents a solution to the problem of inter-thread interference. The CATP logic identifies thread (e.g., application) criticality and prioritizes the demand and prefetch requests of an application appropriately to enable the critical thread to make faster progress. The CATP logic detects which threads are critical. A thread that stalls waiting for memory for a large fraction of its execution time is critical and would benefit from faster service for its requests at the main memory. Therefore, in order to detect criticality, the number of cycles each thread is stalled waiting for memory requests is monitored. In one implementation, the thread with the most stall cycles is critical if the fraction of the thread's stall cycles over all threads' stall cycles is above a threshold value. The demand requests of the critical thread are prioritized ahead of other requests at the memory controller in order to enable the demand requests of the critical thread to be served faster.

The CATP logic also determines if the critical thread would benefit if its prefetch requests are served faster. This would be the case if the critical thread's prefetches have high accuracy (i.e., the prefetcher is able to accurately predict the access pattern and prefetch a data block before a demand request needs it). The prefetch accuracy of each thread is measured and the prefetch requests of the critical thread are prioritized over all other prefetch requests. These same underlying principles can be applied to provide Quality of Service (QoS) when the OS identifies a thread as critical.

CATP logic takes into account prefetch accuracy along with criticality and prioritizes prefetch and demand requests accordingly. Conventional solutions do not employing criticality information in conjunction with prefetch accuracy information to perform request prioritization at the memory controller.

In addition, CATP logic identifies and represents criticality at a thread level and prioritizes only one critical thread at any time, resulting in a very simple prioritization mechanism. Conventional solutions, on the other hand, not only do not take into account prefetches, but also record criticality at the instruction level and compare stall times from past execution across all entries in a criticality table to determine which requests to prioritize which makes the memory controller scheduling and prioritization logic complex and adds significant hardware overhead.

FIG. 1A illustrates criticality-aware thread prioritization (CATP) logic 110 in a multi-core processor 150, according to one embodiment. The multi-core processor 150 includes cores 100 (e.g., core 100a, core 100b, core 100c, core 100d, etc.). The multi-core processor 150 may include a memory controller 120. The multi-core processor 150 may be coupled to a memory 130 (e.g., main memory, DRAM memory, etc.).

Figure 1B:
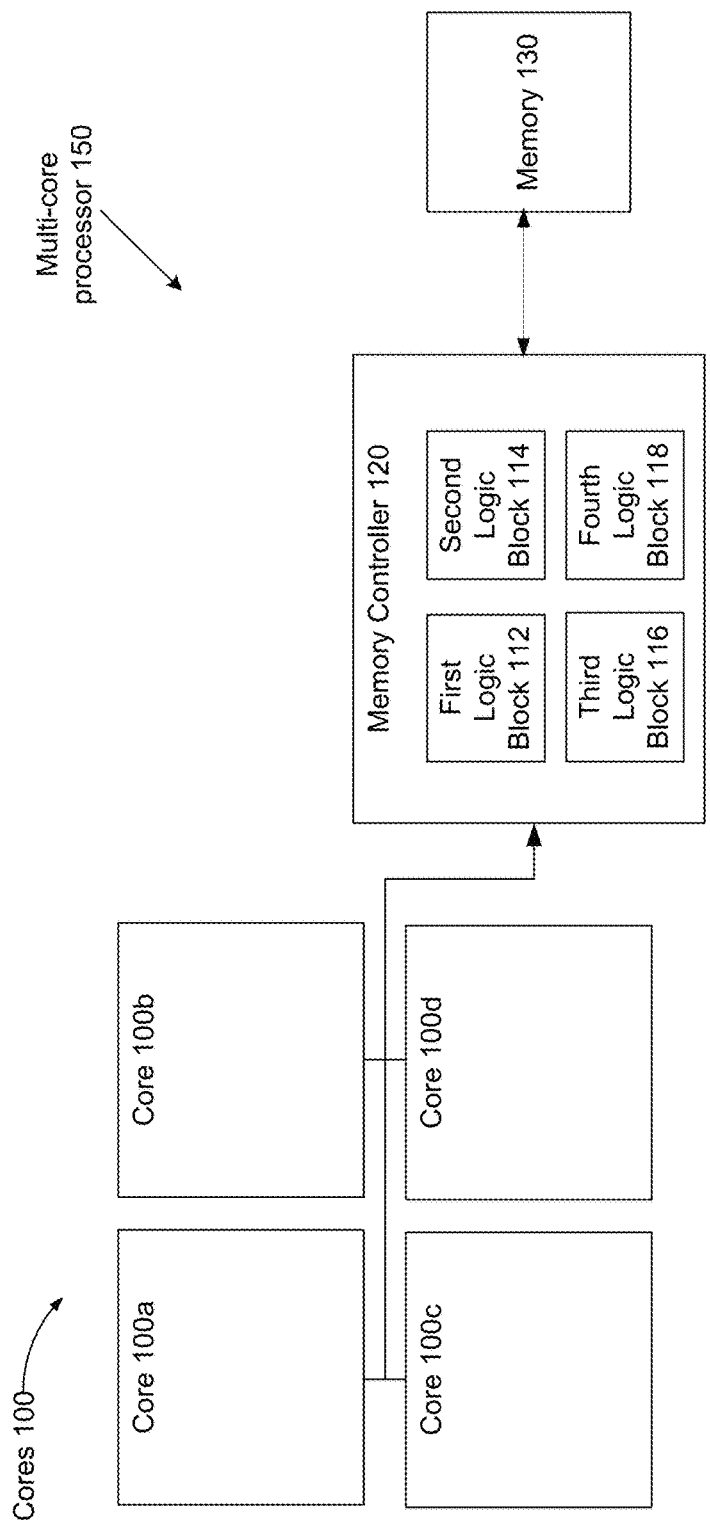
FIG. 1B illustrates the CATP logic in the multi-core processor, according to another embodiment.
Figure 1C:
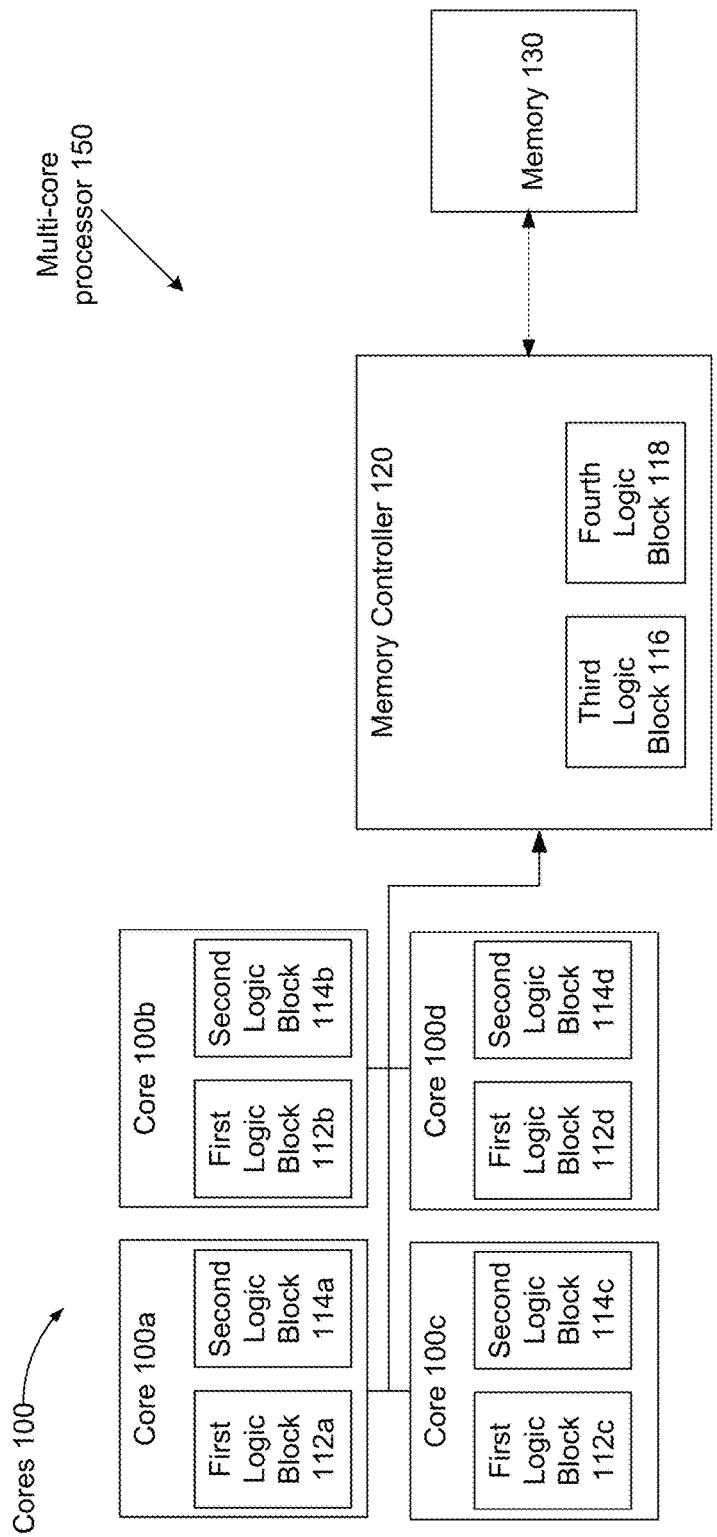
FIG. 1C illustrates the CATP logic in the multi-core processor, according to another embodiment.

The multi-core processor 150 includes CATP logic 110. The CATP logic 110 may include a first logic block 112, a second logic block 114, a third logic block 116, and a fourth logic block 118. The CATP logic 110 may include more or less logics than shown in FIG. 1A. The first logic block 112, second logic block 114, third logic block 116, and fourth logic block 118 may be located in different locations. In one embodiment, as shown in FIG. 1B, the first logic block 112, second logic block 114, third logic block 116, and fourth logic block 118 are located in the memory controller 120. In another embodiment, as shown in FIG. 1C, the first logic block 112 and second logic block 114 are located in the cores 100 and the third logic block 116 and fourth logic block 118 are located in the memory controller 120.

Returning to FIG. 1A, A multi-core processor 150 includes cores 100 to execute threads and to monitor metrics for each of the threads during an interval. The metrics may include stall cycle values, a first number of prefetches of a first type (e.g., useful prefetches), and a second number of prefetches of a second type (e.g., useless prefetches). A first set of counters may be used to monitor the stall cycles, prefetches of a first type, and prefetches of a second type during the interval. A second set of counters may be used to compute stall fraction and prefetch accuracy. Table 1 shows the counters that may be used to implement CATP logic 110. The stall fraction and prefetch accuracy need to be communicated to the memory controller 120 at the end of each interval. In one embodiment, the memory controller 120 calculates the stall fraction and the prefetch accuracy. In another embodiment, the cores 100 calculate the stall fraction and the prefetch accuracy. The memory controller 120 uses these quantities and comparator logic to determine the critical thread (e.g., the critical application or thread to be prioritized during the next interval).

In order to enforce these priorities, the thread id of the thread from which each request originates is to be communicated to the memory controller 120. The memory controller 120 then compares the thread id of requests with the id of the critical thread and prioritizes the critical thread's demand and prefetch requests using the prioritization scheme described herein.

TABLE 1

Counters used to implement CATP logic 110

| Name of the counter | Description | Size (in bytes) |
| --- | --- | --- |
| stall cycles(i) | Number of cycles a core running thread(i) is stalled when the instruction at the head of the ROB is a load and at least one LLC miss is outstanding to main memory | 4 |
| prefetches of a first type(i) | Number of prefetch requests of thread(i) that are used at least once before being evicted from the L2 cache | 4 |
| prefetches of a second type(i) | Number of prefetch requests of thread(i) that are not used even once before being evicted from the L2 cache | 4 |
| stall fraction(i) | Fraction of stall cycles over total cycles in an interval | 1 |
| prefetch accuracy(i) | Fraction of prefetches of a first type over sum of prefetches of a first and second type | 1 |

CATP logic 110 operates on an interval basis. During an interval (e.g., 50,000 cycles), the cores 100 monitor stall cycles by counting memory-related stall cycles of each thread as the number of cycles when a) a thread is stalled, b) the instruction at the head of the reorder buffer (ROB) of the core executing the thread is a load, and c) there are outstanding misses from the last level cache (LLC) to the main memory.

Prefetching may speed up the execution of a thread by reducing latency. In one embodiment, the majority (e.g., about 70%) of requests seen at the memory controller 120 are prefetch requests. Prefetching requests an instruction or data block from memory 130 before it is actually needed. When the block comes back from memory 130, the block is placed in a cache. When the instruction or data block is actually needed, it can be accessed much more quickly from the cache than if it the thread had to make a demand request from memory 130. Thus, prefetching hides memory access latency and reduces wait time. In one embodiment, the number of prefetches of a first type (e.g., useful) and number of prefetches of a second type (e.g., useless) are counted for each of the threads. In another embodiment, the prefetches are counted for just the critical thread. Prefetches of the first type is when corresponding data was brought into an L2 cache (e.g., midlevel cache) from main memory and the corresponding data was used by a subsequent demand request (e.g., a prefetch request is counted as useful if the data corresponding to the request was brought into the L2 cache from main memory and used by a subsequent demand request). Prefetches of the second type is when corresponding data was brought into the L2 cache from the main memory and the corresponding data was evicted without being used (e.g., a prefetch request is counted as useless if the data corresponding to the request was brought into the L2 cache from main memory, but was evicted without being used).

The CATP logic 110 computes a stall fraction for each of the threads during the interval using the stall cycle values. The relative criticality of each thread is calculated as the stall fraction of each thread. The equation for calculating stall fraction of a thread, i, may be shown as: stall fraction(i)= (stall cycles(i))/(sum(j)(stall cycles(j)), for j=each thread. The stall fraction of a corresponding thread is a ratio of the stall cycles of the corresponding thread to sum of stall cycles of all the threads. Stall fraction of a thread is an indicator of how much more or less the thread is stalling from waiting for the main memory as compared to the other threads.

The CATP logic 110 identifies a thread from the threads with a highest stall fraction of the threads. CATP logic 110 uses threads' stall fraction to determine which threads' demand requests and prefetch requests to prioritize.

The CATP logic 110 determines if the highest stall fraction is greater than a stall threshold. If the stall fraction of the most stalled thread is greater than a threshold (stall threshold), the most stalled thread may be stalling for a significantly greater fraction of time than the other threads. Hence, CATP logic 110 designates this thread as the critical thread and proposes to prioritize the thread's demand requests at the memory controller 120, in order to enable the thread to make faster progress.

The CATP logic 110 prioritizes demand requests of the identified thread (e.g., critical thread). The demand requests of the critical thread (if a thread is identified as critical) are given the highest priority over all other threads' requests at the memory controller 120.

The CATP logic 110 computes a prefetch accuracy of the identified thread (e.g., critical thread) during the interval using the first number of prefetches of the first type and the second number of prefetches of the second type. The equation for calculating prefetch accuracy may be shown as: for a thread i, prefetch accuracy(i)=(prefetches of a first type (i))/(prefetches of a first type(i)+prefetches of a second type(i)). The prefetch accuracy is a ratio of the first number of prefetches of the first type to a sum of the first number of prefetches of the first type and the second number of prefetches of the second type. Prefetch accuracy of a thread indicates what fraction of a thread's prefetches are useful and correspond to blocks that would have been brought in by a subsequent demand request.

The CATP logic 110 determines if the prefetch accuracy is greater than a prefetch threshold. If the prefetch accuracy of the critical thread is greater than a threshold (prefetch threshold), the thread's prefetches are considered accurate.

The CATP logic 110 prioritizes prefetch requests of the identified thread (e.g., critical thread) at the memory controller 120. The prefetch requests of the critical thread, if prioritized, are given a lower level of priority than the demand requests of the critical thread (since demand requests are more critical) and the same level of priority as the demand requests of the other threads. The prefetch requests of the critical thread are not given higher priority than the demand requests of other threads in order to minimize interference caused to other threads.

The CATP logic 110 may include first logic block 112 to compute the stall fraction, second logic block 114 to compute the prefetch accuracy, third logic block 116 to prioritize the demand requests of the identified thread, and fourth logic block 118 to prioritize the prefetch requests of the identified thread.

The prioritizing, by the CATP logic 110, of the demand requests of the identified thread includes processing the demand requests of the identified thread prior to processing demand requests from the other threads. The prioritizing, by the CATP logic 110, of the prefetch requests of the identified thread includes processing the prefetch requests of the identified thread after processing the demand requests of the identified thread and prior to processing prefetch requests from the other threads.

Third logic block 116 and fourth logic block 118 may be located in the cores 100 or in memory controller 120.

FIG. 1B illustrates CATP logic 110 in the multi-core processor 150, according to another embodiment. In one embodiment, the first logic block 112, the second logic block 114, the third logic block 116, and the fourth logic block 118 reside in the memory controller. In FIG. 1B, the monitoring of the metrics is done at the cores 100 and the processing of the metrics to compute stall fraction and prefetch accuracy are done at the memory controller 120.

FIG. 1C illustrates CATP logic 110 in a multi-core processor 150, according to another embodiment. In one embodiment, the first logic block 112 (e.g., first logic block 112a, 112b, 112c, 112d, etc.) and the second logic block 114 (e.g., second logic block 114a, 114b, 114c, 114d, etc.) reside in each of the cores 100. The third logic block 116 and the fourth logic block 118 reside in the memory controller 120. In FIG. 1C, the cores 100 monitor stall cycles, useful prefetches, and useless prefetches and also computes stall fraction and prefetch accuracy, which are then passed down to the memory controller 120, which computes priorities.

Figure 2:
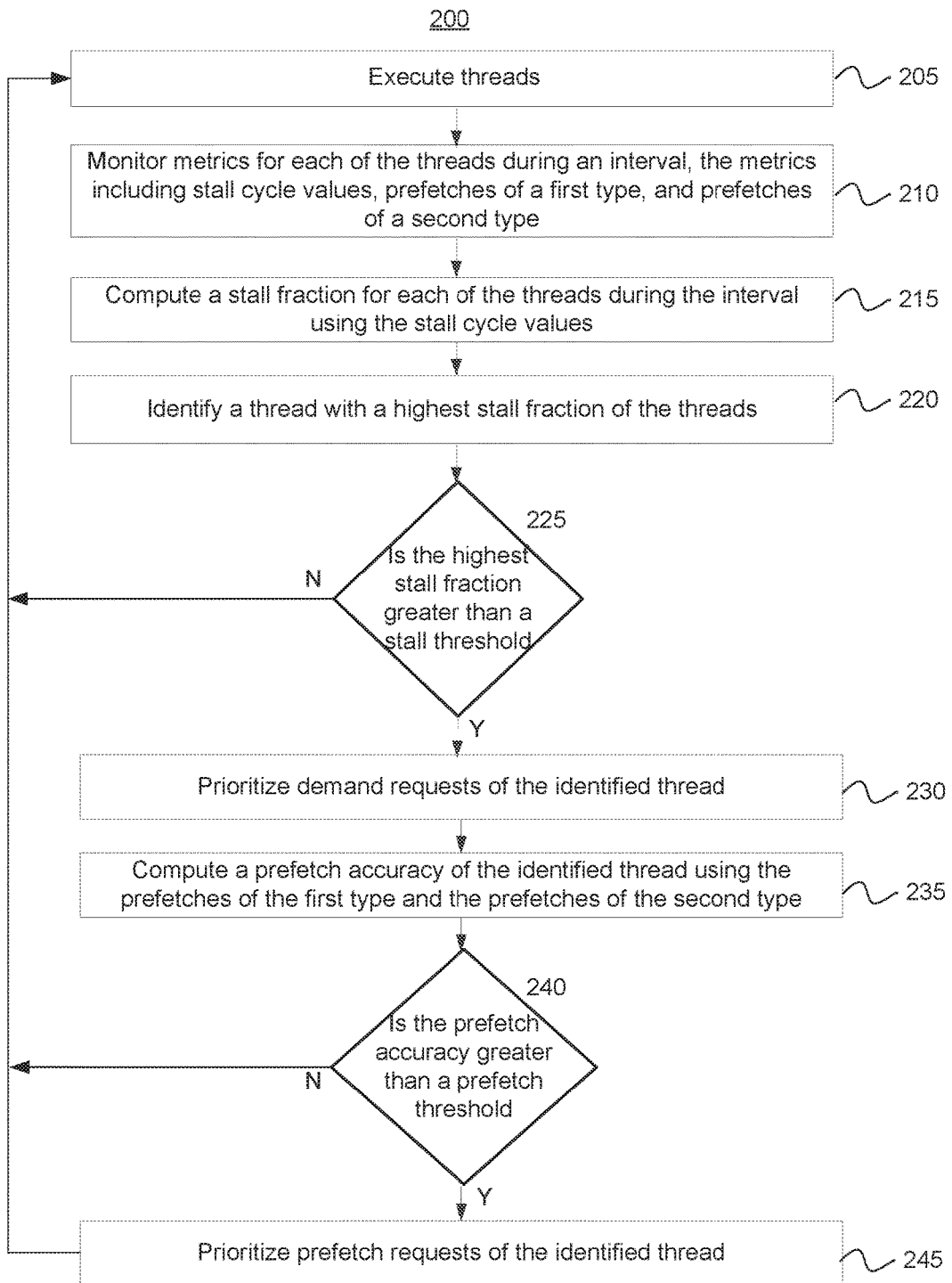
FIG. 2 is a flow diagram of a method of implementation of the CATP logic, according to one embodiment.

FIG. 2 is a flow diagram of a method 200 of implementation of the CATP logic 110, according to one embodiment. Method 200 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 200 may be performed, in part, by multi-core processor 150 of one or more of FIGS. 1A-1C. In another embodiment, method 200 may be performed on one or more of an aggregator, a microcontroller, and so forth.

For simplicity of explanation, the method 200 is depicted and described as a series of acts. However, acts in accordance with this disclosure can occur in various orders and/or concurrently and with other acts not presented and described herein. Furthermore, not all illustrated acts may be performed to implement the method 200 in accordance with the disclosed subject matter. In addition, those skilled in the art will understand and appreciate that the method 200 could alternatively be represented as a series of interrelated states via a state diagram or events.

Referring to FIG. 2, at block 205, the processing logic executes, by cores 100, threads.

At block 210, the processing logic monitors, by the cores 100, metrics for each of the threads during an interval, the metrics including stall cycle values, a first number of prefetches of a first type, and a second number of prefetches of a second type.

At block 215, the processing logic computes, by a first logic block 112 of criticality-aware thread prioritization (CATP) logic 110, a stall fraction for each of the threads during the interval using the stall cycle values.

At block 220, the processing logic identifies, by the CATP logic 110, a thread from the threads with a highest stall fraction of the threads.

At block 225, the processing logic determines, by the CATP logic 110, if the highest stall fraction is greater than a stall threshold. If the highest stall fraction is greater than a stall threshold, the flow proceeds to block 230. If the processing logic determines that the highest stall fraction is not greater than a stall threshold, the flow proceeds to block 205.

At block 230, the processing logic prioritizes, by a third logic block 116 of the CATP logic 110, demand requests of the identified thread.

At block 235, the processing logic computes, by a second logic block 114 of the CATP logic 110, a prefetch accuracy of the identified thread during the interval using the first number of prefetches of the first type and the second number of prefetches of the second type.

At block 240, the processing logic determines, by the CATP logic 110, if the prefetch accuracy is greater than a prefetch threshold. If the prefetch accuracy is greater than a prefetch threshold, the flow proceeds to block 245. If the processing logic determines that the prefetch accuracy is not greater than the prefetch threshold, the flow proceeds to block 205.

At block 245, the processing logic prioritizes, by a fourth logic block 118 of the CATP logic 110, prefetch requests of the identified thread. After which, the flow proceeds to block 205.

Figure 3A:
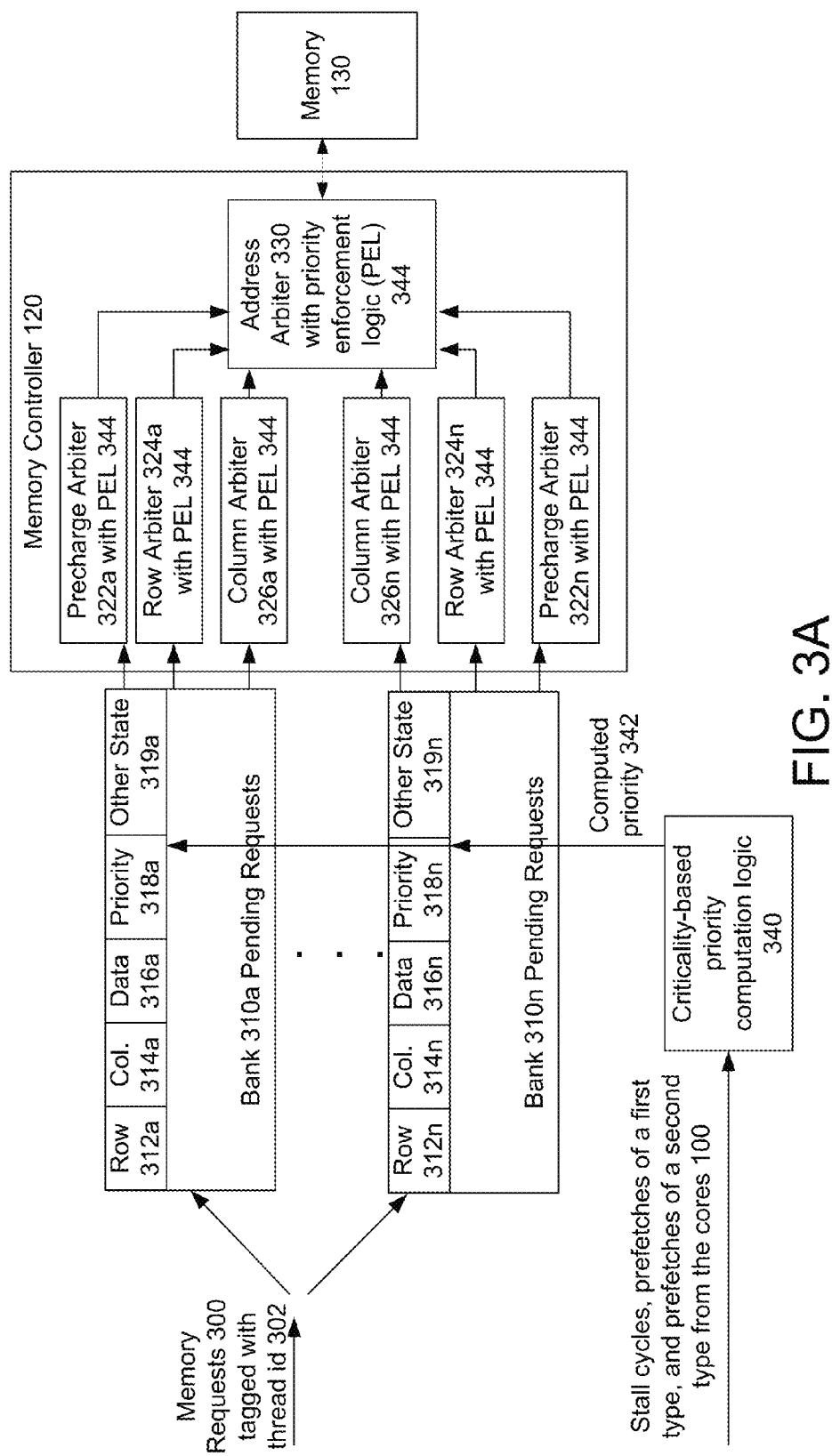
FIG. 3A illustrates a memory controller of the multi-core processor that implements the CATP logic, according to one embodiment.

FIG. 3A illustrates a memory controller 120 of a multi-core processor 150 that implements CATP logic 110, according to another embodiment. While FIGS. 1A-1C illustrate the cores 100 and the memory controller 120 at a high level, FIG. 3A illustrates specific components of the memory controller 120 that are used to implement CATP logic 110.

The cores 100 execute threads and monitor metrics (e.g., stall cycle values, a first number of prefetches of a first type, and a second number of prefetches of a second type) for each of the threads during an interval. The threads have memory requests 300 (e.g., demand requests, prefetch requests) for the memory 130. Each memory request 300 may be tagged with a thread id 302 for priority computation.

Processing a memory request 300 at the memory 130 may include a row operation, a column operation, a precharge operation, and so forth (e.g., DRAM operations such as bank precharge, row activation, and column access may be necessary to complete memory requests 300). The memory controller 120 may choose one or more row, column, or precharge operations each cycle, subject to resource constraints, to advance (e.g., process) one or more of the pending memory requests 300.

As memory requests 300 arrive, they are allocated storage space while they await service from the memory controller 120. In one embodiment, the memory requests are initially sorted by bank 310 (e.g., DRAM bank). In bank 310, each pending memory request 300 may be represented by fields (e.g., address (row 312, col 314), data 316, priority 318, other state 319 (e.g., any additional state for a scheduling algorithm, age of reference, whether the reference targets the currently active row, etc.), valid (V), load/store (L/S), etc.). In one embodiment, the pending request storage could be shared by all the banks 310 (e.g., with the addition of a bank address field) to allow dynamic allocation of the storage at the cost of increased logic complexity in the memory controller 120.

In one embodiment, as shown in FIG. 3A, the counts of stall cycles, prefetches of a first type, and prefetches of a second type are transmitted from the cores 100 to the memory controller 120 (corresponding to FIG. 1B). The criticality-based priority computation logic 340 receives the stall cycles, prefetches of a first type, and prefetches of a second type from the cores 100, computes priority (e.g., calculates stall fraction and prefetch accuracy, compares to stall threshold, compares to prefetch threshold, etc.) in view of the thread id 302 in the memory request 300, and propagates the computed priority 342 to the incoming memory requests 300 (e.g., transmits the computed priority 342 to the priority 318 field). In one embodiment, CATP logic 110 includes the criticality-based priority computation logic 340. In another embodiment, the criticality-based priority computation logic 340 includes first logic block 112 and second logic block 114.

Each bank 310 may correspond to a precharge arbiter 322 and a row arbiter 324. The precharge arbiter 322 decides when the corresponding bank 310 should be precharged. The row arbiter 324 for each bank 310 decides which row 312, if any, should be activated when the bank 310 is idle. In one embodiment, each bank 310 has a corresponding column arbiter 326. In another embodiment, each bank 310 shares a common column arbiter 326 (e.g., column arbiter 326 is per bank) (e.g., column arbiter 326 is shared across banks). A common column arbiter 326 may grant shared data line requests to a single column access out of all the pending memory requests 300 to all of the banks 310.

Each precharge arbiter 322, row arbiter 324, and column arbiter 326 send selected operations to a single address arbiter 330 which grants the shared address resources to one or more of the selected operations.

Each of the precharge arbiter 322, row arbiter 324, column arbiter 326, and address arbiter 330 may include priority enforcement logic (PEL) 344. In one embodiment, PEL 344 is part of CATP logic 110. In another embodiment, PEL 344 includes third logic block 116 and fourth logic block 118. The priority enforcement logic (PEL) 344 enforces the computed priorities 342 (e.g., in view of the priority 318 field) at the different arbiters (e.g., precharge arbiter 322, row arbiter 324, column arbiter 326, and address arbiter 330). In one embodiment, PEL 344 includes third logic block 116 of the CATP logic 110 to prioritize demand requests of the identified thread (e.g., critical thread) and PEL 344 includes fourth logic block 118 of the CATP logic 110 to prioritize prefetch requests of the identified thread (e.g., critical thread).

The precharge arbiters 322, row arbiters 324, and column arbiters 326 may use one or more policies (e.g., policies of PEL logic 344) to select DRAM operations. The combination of policies used by the units along with the address arbiter's policy (e.g., policy of PEL logic 344) determines the memory access scheduling algorithm. The address arbiter 330 decides which of the selected precharge, activate, and column operations (e.g., corresponding to the demand request of the critical thread, corresponding to the prefetch requests of the critical thread, etc.) to perform.

Figure 3B:
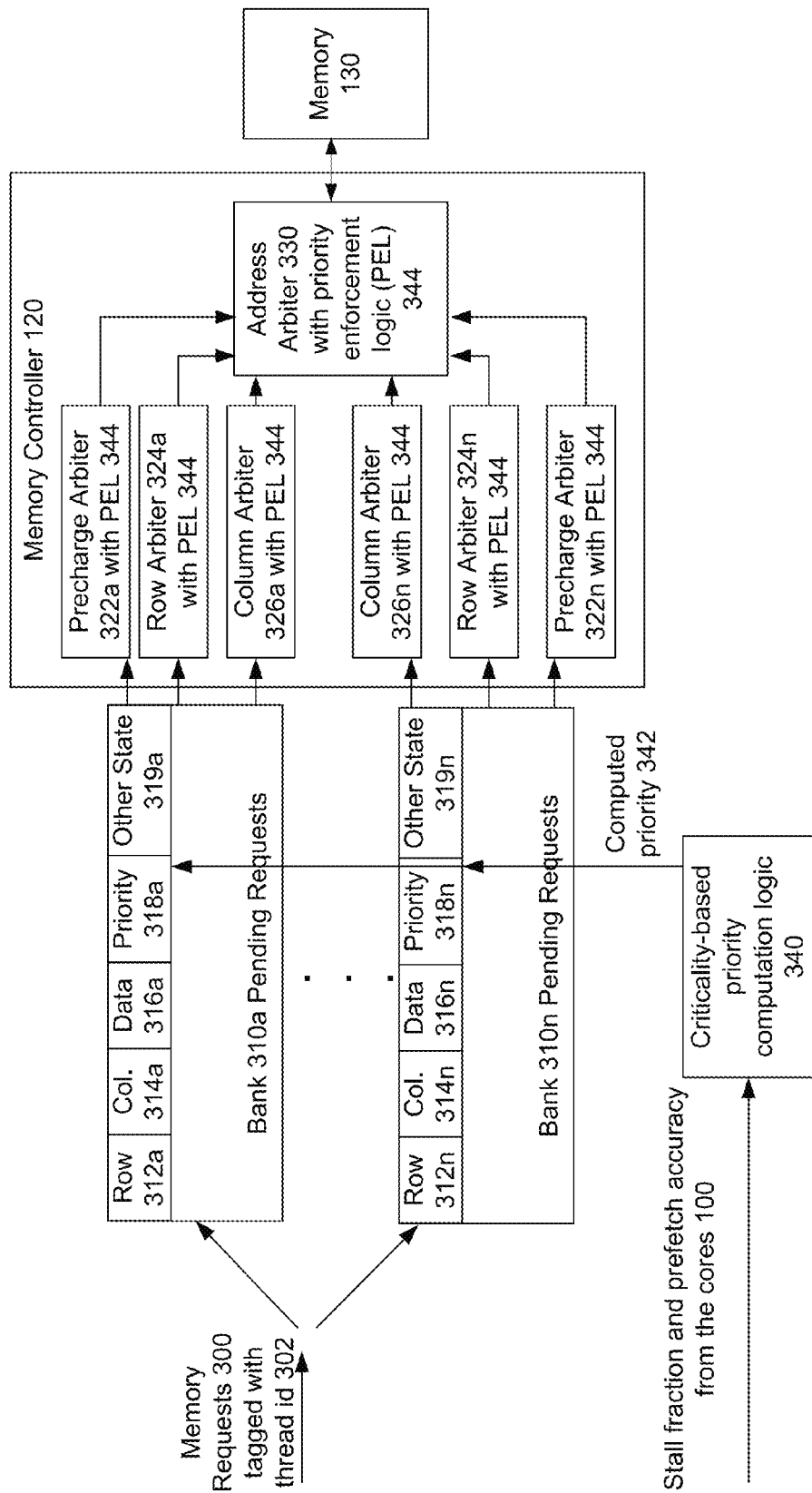
FIG. 3B illustrates the memory controller of the multi-core processor that implements the CATP logic, according to another embodiment.

FIG. 3B illustrates a memory controller 120 of a multi-core processor 150 that implements CATP logic 110, according to another embodiment. In FIG. 3B, stall fraction and prefetch accuracy are computed at the cores 100 (e.g., first logic block 112 and second logic block 114 of CATP logic 110 are located at the cores 100) and are sent to the memory controller 120 (corresponding to FIG. 1C). The criticality-based priority computation logic 340 computes priorities starting from the stall fraction and prefetch accuracy values received from the cores 100.

Figure 4A:
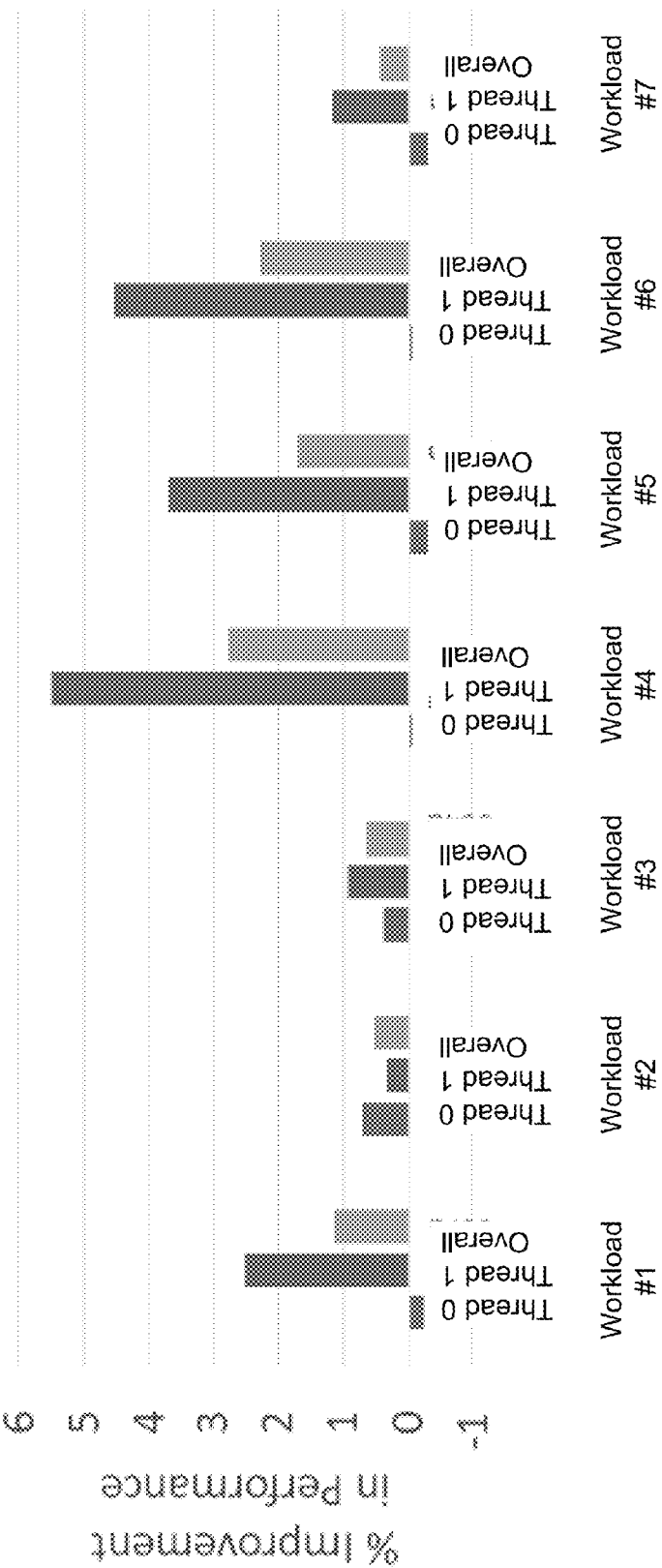
FIG. 4A is a bar graph illustrating performance improvement for a first set of workloads, according to one embodiment.

FIG. 4A is a bar graph illustrating performance improvement for a first set of workloads, according to one embodiment. FIG. 4A shows the performance improvement with CATP logic 110 over system a with 2 memory channels, 1 MB last level cache per core, for memory-intensive two-thread workloads. CATP logic 110 improves the performance of the critical thread, while degrading the other threads' performance minimally, thereby improving overall system performance.

Figure 4B:
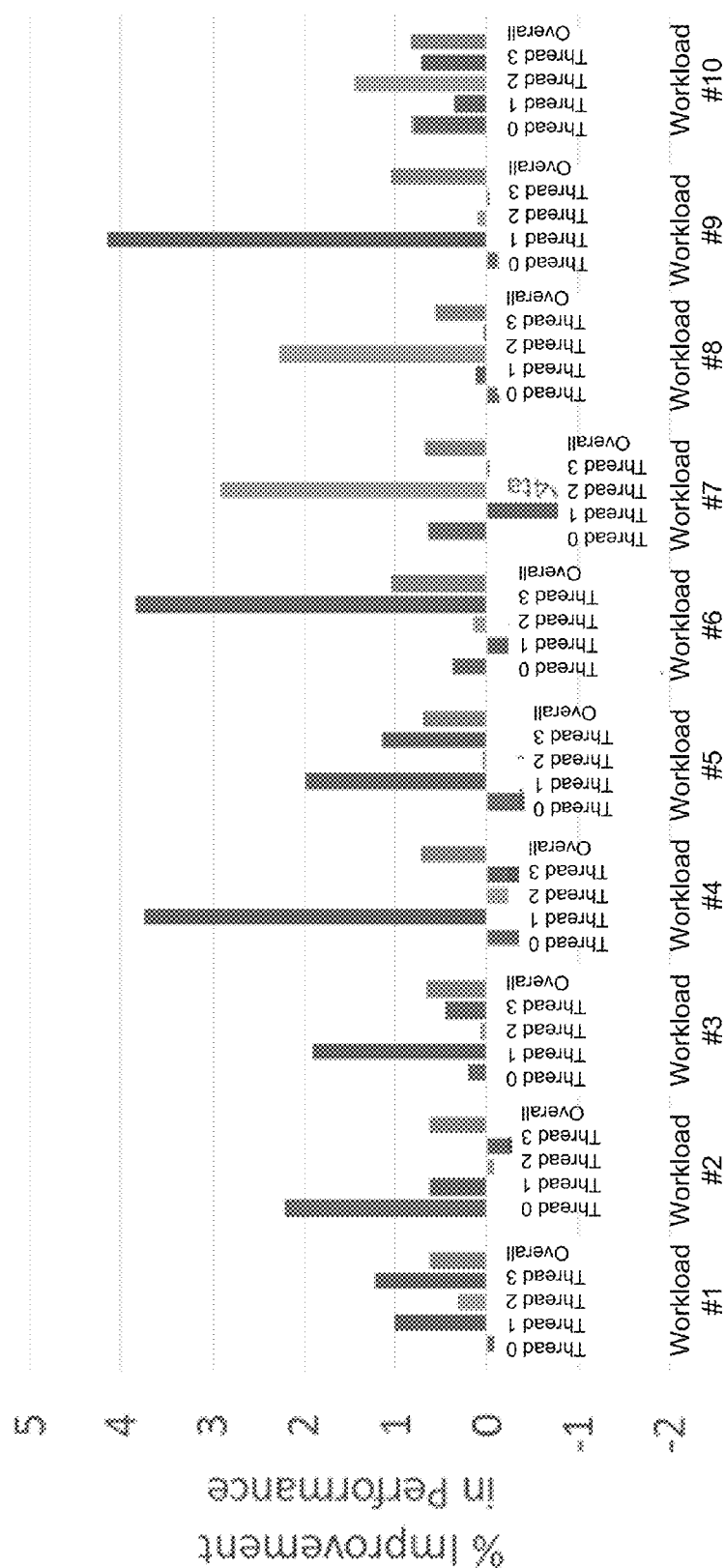
FIG. 4B is a bar graph illustrating performance improvement for a second set of workloads, according to one embodiment.

FIG. 4B is a bar graph illustrating performance improvement for a second set of workloads, according to one embodiment. FIG. 4B shows the performance improvement with CATP logic 110 over a system with 2 memory channels, 2 MB last level cache per core, for memory-intensive four-thread workloads. CATP logic 110 improves the performance of the critical thread, while degrading the other threads' performance minimally, thereby improving overall system performance.

Figure 5:
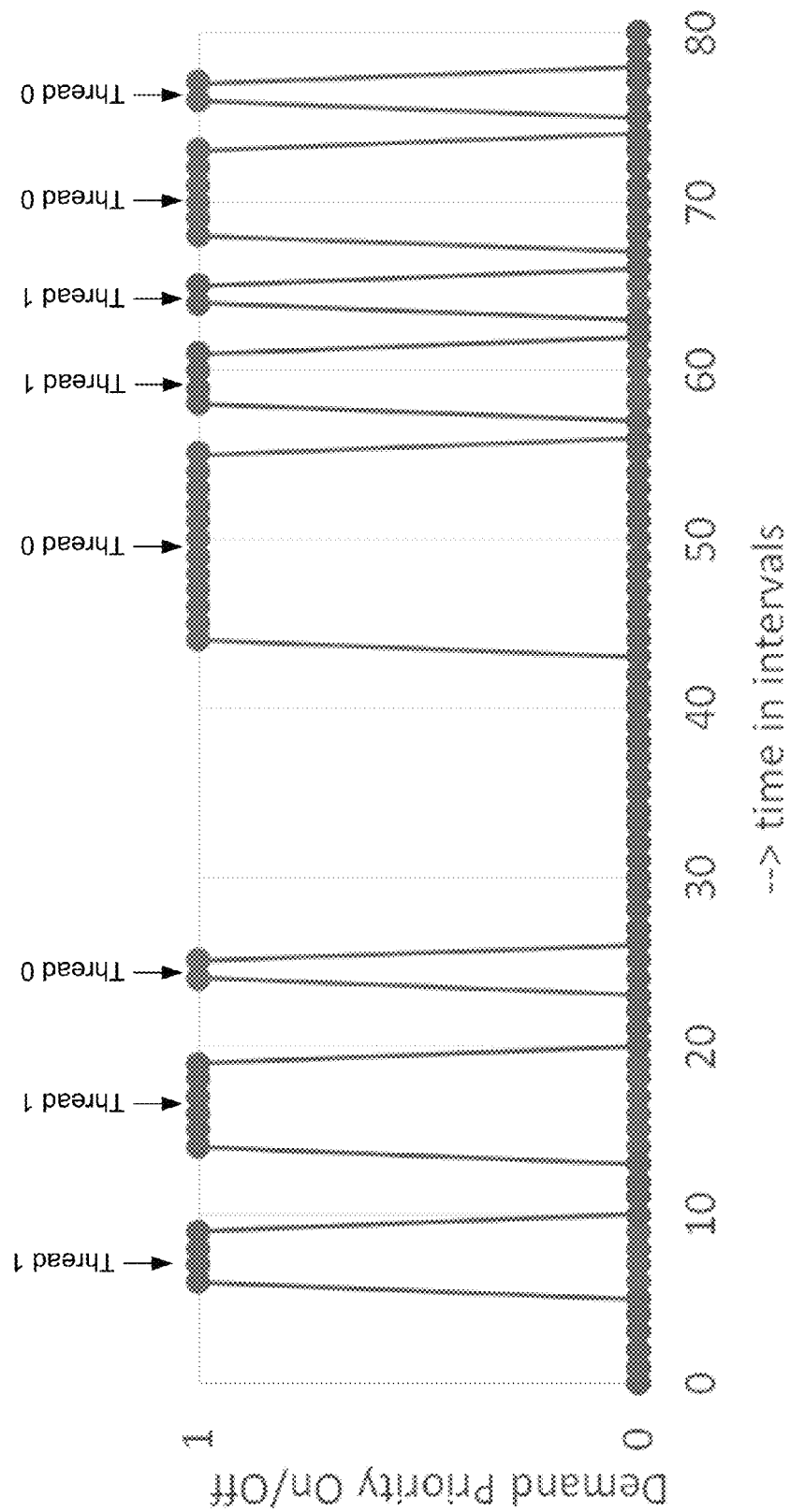
FIG. 5 is a graph illustrating changing demand priority of threads over time, according to one embodiment.

FIG. 5 is a graph illustrating changing demand priority of threads over time, according to one embodiment. FIG. 5 shows how thread priorities change over time when the CATP logic 110 is employed in a representative two thread workload. FIG. 5 shows how the priority for demand requests change over time for two threads, thread 0 and thread 1. There are intervals when thread 0 is identified as the critical thread and its demand requests are prioritized, whereas other times when thread 1 is identified as the critical thread. There are intervals (e.g., about 27 to 42, etc.) when no thread is identified as critical since no thread's stall fraction is greater than the stall threshold (e.g., 0.7), indicated by '0' for both threads in FIG. 5.

Figure 6:
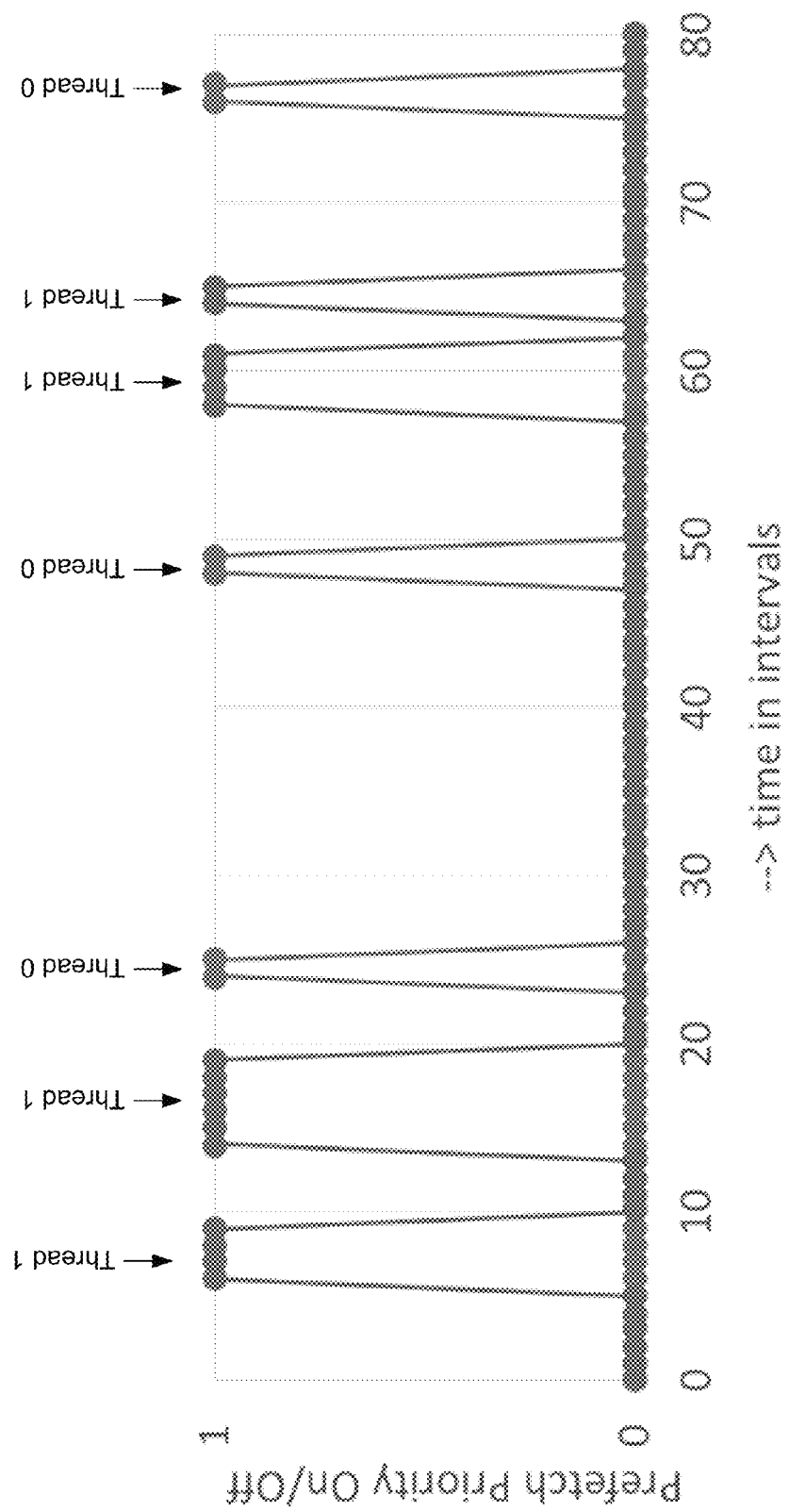
FIG. 6 is a graph illustrating changing prefetch priority of threads over time, according to one embodiment.

FIG. 6 is a graph illustrating changing prefetch priority of threads over time, according to one embodiment. FIG. 6 shows how thread priorities change over time when the CATP logic 110 is employed in a representative two thread workload. FIG. 6 shows how the priority for prefetch requests changes over time for the two threads, thread 0 and thread 1. A thread's prefetch requests are prioritized only when the thread is critical and has prefetch accuracy greater than a threshold (e.g., 0.5). Hence, during some intervals, a thread's demand requests are prioritized, but its prefetch requests are not (especially true for thread 0 in the examples shown in FIGS. 5-6).

Figure 7:
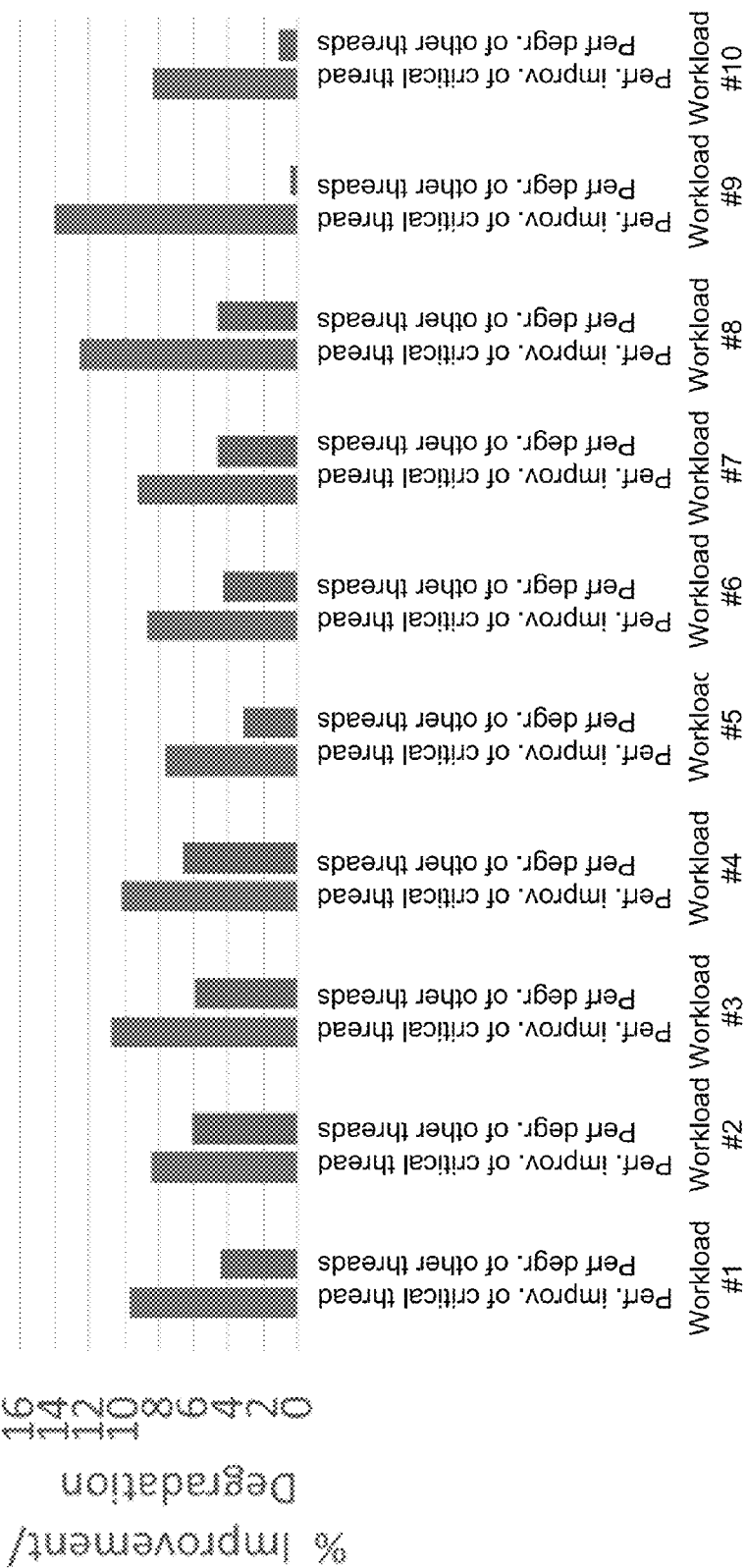
FIG. 7 is a bar graph illustrating Quality of Service (QoS) through demand and prefetch prioritization, according to one embodiment.

FIG. 7 is a bar graph illustrating Quality of Service (QoS) through demand and prefetch prioritization, according to one embodiment. A combination of demand and prefetch prioritization can be used to provide QoS to specific threads. While the CATP logic 110 described above seeks to improve overall system performance, there could be scenarios especially in a data center setting, where a specific application/thread is considered critical and needs to be provided QoS even at the cost of performance degradation to other threads. In such a scenario, the system software would communicate which thread is critical to the hardware. One knob the hardware can employ to provide QoS to a critical thread is prioritization of its demand and prefetch requests in the memory controller.

A multi-core processor 150 may include cores 100 to execute threads. System software may communicate which thread is critical to the multi-core processor 150. The multi-core processor 150 may prioritize demand requests of the critical thread.

In one embodiment, the multi-core processor 150 (e.g., memory controller 120) prioritizes prefetch requests of the critical thread independent of any prefetch values or prefetch accuracy values. The multi-core processor 150 (e.g., memory controller 120) may prioritize prefetch requests of the identified thread with or without monitoring prefetch values and calculating the prefetch accuracy. The multi-core processor 150 (e.g., memory controller 120) may prioritize prefetch requests of the identified thread even if the prefetch accuracy is below a prefetch threshold.

FIG. 7 shows the impact of prioritizing both prefetch and demand requests of the critical thread on the performance of the critical thread and the other threads, over a baseline Skylake system with 2 memory channels, 2 MB cache per core, for four-thread workloads. The critical thread gains by 8-14% while degrading the other threads' average performance by at most 6.5% when both demand and prefetch requests are prioritized.

In another embodiment, the cores 100 monitor metrics for each of the threads during an interval. The metrics may include one or more of stall cycle values, a first number of prefetches of a first type, and a second number of prefetches of a second type. The CATP logic 110 may identify the critical thread in view of the communication from the system software indicating which thread is the critical thread. The CATP logic 110 may prioritize the demand requests of the critical thread. The CATP logic 110 may compute a prefetch accuracy of the critical thread during the interval using the first number of prefetches of the first type and the second number of prefetches of the second type. The CATP logic 110 may determine the prefetch accuracy is greater than a prefetch threshold and prioritize prefetch requests of the critical thread.

Figure 8:
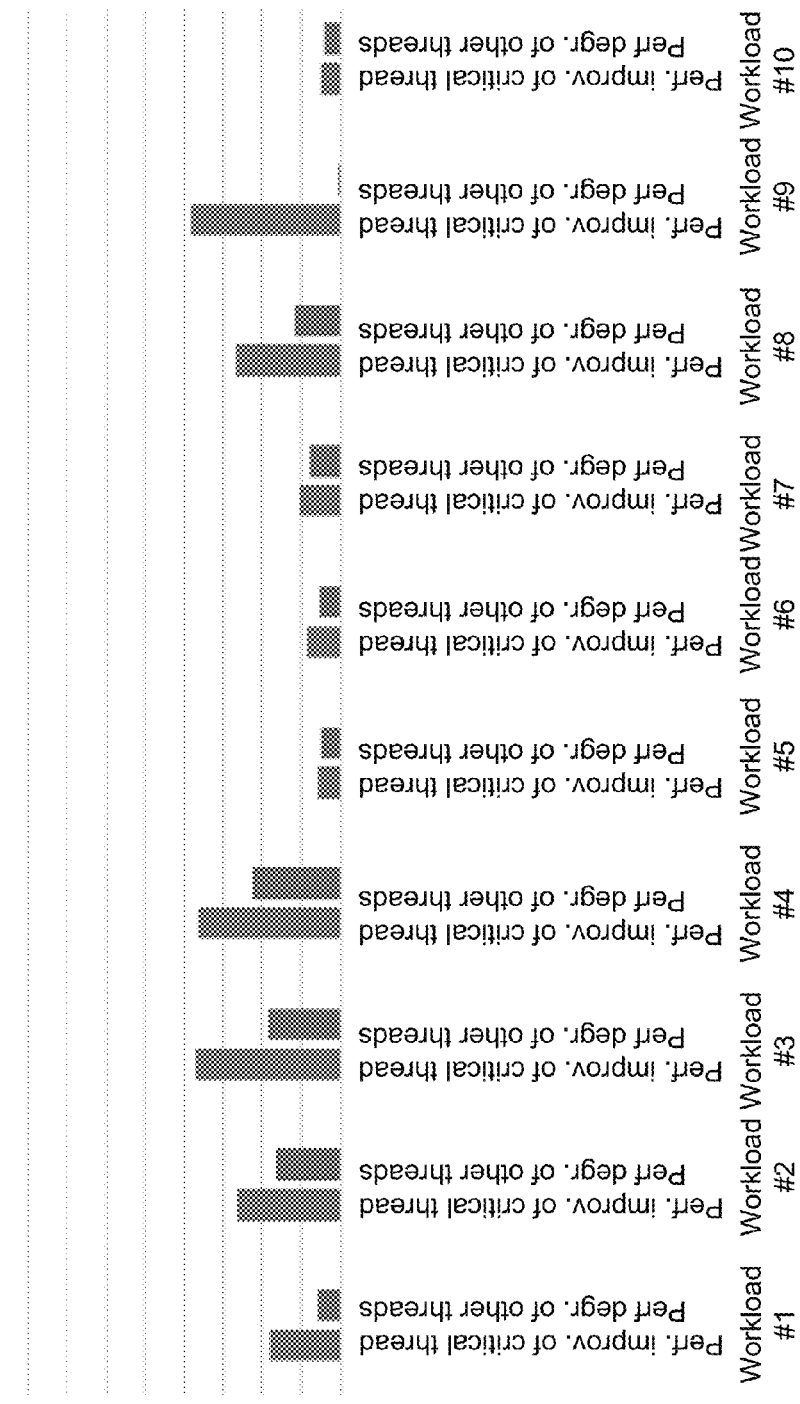
FIG. 8 is a bar graph illustrating QoS through demand-only prioritization, according to one embodiment.

FIG. 8 is a bar graph illustrating QoS through demand-only prioritization, according to one embodiment. Prioritizing only demand requests provides significantly lower performance improvement for the critical thread, as shown in FIG. 8, as low as 1% performance benefit for some workloads, and a maximum of only 8%, as compared to a maximum of 14% from prioritizing both demand and prefetch requests. Therefore, prioritization of both demand and prefetch requests (as shown in FIG. 7) is a powerful knob when one thread's performance is identified as much more critical than the other threads' performance by the system software. In one embodiment, the prefetch requests of the critical thread are prioritized over the prefetch requests of the other threads. In another embodiment, the prefetch requests of the critical thread are prioritized over the other threads' demand and prefetch requests to enhance the performance of the critical thread.

Figure 9:
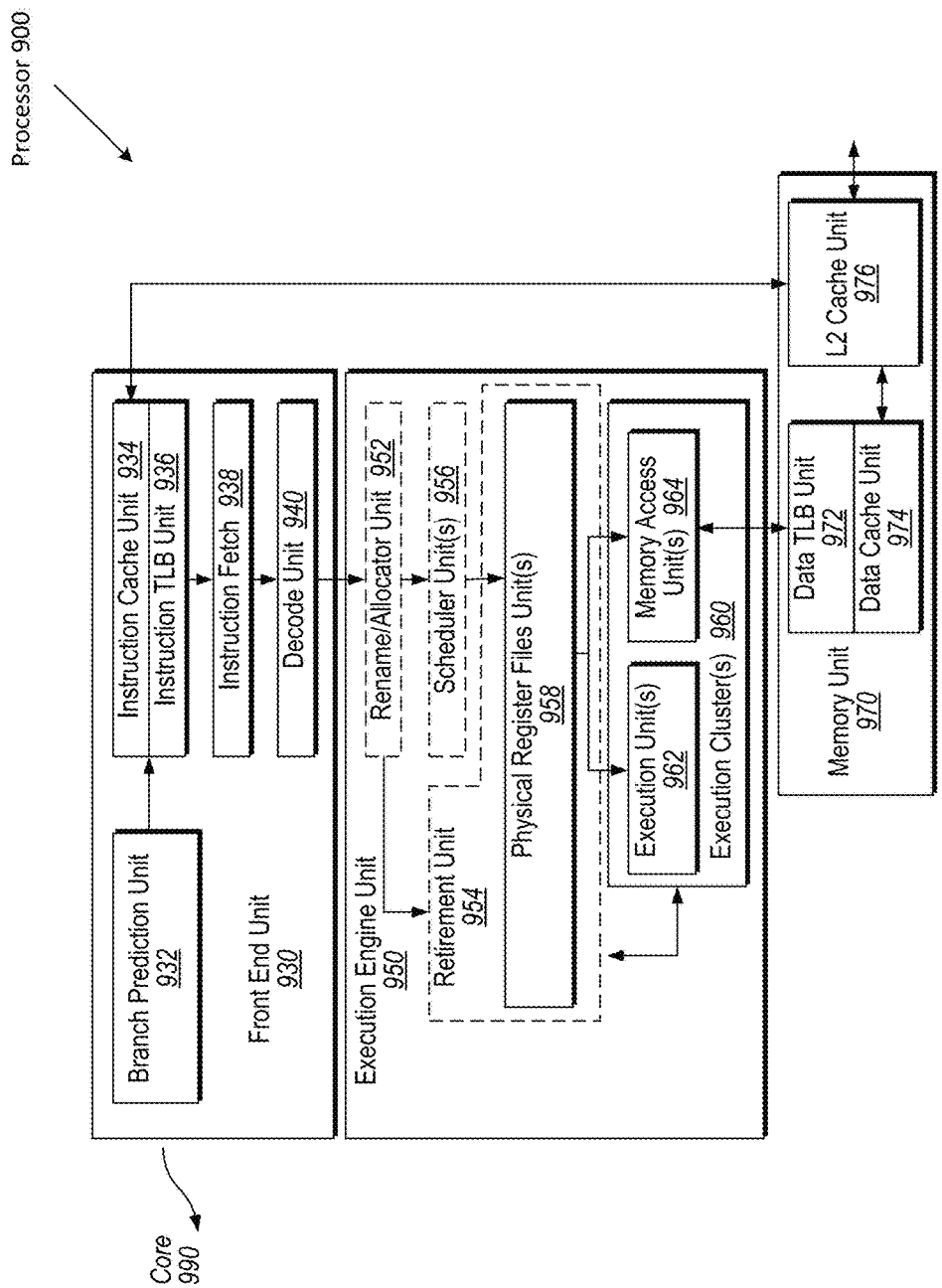
FIG. 9 is a block diagram illustrating a micro-architecture for a processor that implements the CATP logic, according to one embodiment.

FIG. 9 is a block diagram illustrating a micro-architecture for a processor that implements CATP logic 110, according to one embodiment. Specifically, processor 900 depicts an in-order architecture core and a register renaming logic, out-of-order issue/execution logic to be included in a processor according to at least one embodiment of the disclosure. The embodiments of the CATP logic 110 can be implemented in processor 900. In one embodiment, processor 900 is the multi-core processor 150 of FIG. 1A.

Processor 900 includes a front end unit 930 coupled to an execution engine unit 950, and both are coupled to a memory unit 970. The processor 900 may include a core 990 that is a reduced instruction set computing (RISC) core, a complex instruction set computing (CISC) core, a very long instruction word (VLIW) core, or a hybrid or alternative core type. As yet another option, processor 900 may include a special-purpose core, such as, for example, a network or communication core, compression engine, graphics core, or the like. In another embodiment, the core 990 may have five stages.

The front end unit 930 includes a branch prediction unit 932 coupled to an instruction cache unit 934, which is coupled to an instruction translation lookaside buffer (TLB) unit 936, which is coupled to an instruction fetch unit 938, which is coupled to a decode unit 940. The decode unit 940 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. The instruction cache unit 934 is further coupled to the memory unit 970. The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations (RS), central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 958 is overlapped by the retirement unit 954 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which may include a data prefetcher, a data TLB unit 972, a data cache unit (DCU) 974, and a level 2 (L2) cache unit 976, to name a few examples. In some embodiments DCU 974 is also known as a first level data cache (L1 cache). The DCU 974 may handle multiple outstanding cache misses and continue to service incoming stores and loads. It also supports maintaining cache coherency. The data TLB unit 972 is a cache used to improve virtual address translation speed by mapping virtual and physical address spaces. In one exemplary embodiment, the memory access units 964 may include a load unit, a store address unit, and a store data unit, each of which is coupled to the data TLB unit 972 in the memory unit 970. The L2 cache unit 976 may be coupled to one or more other levels of cache and eventually to a main memory.

In one embodiment, the data prefetcher speculatively loads/prefetches data to the DCU 974 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 900 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10:
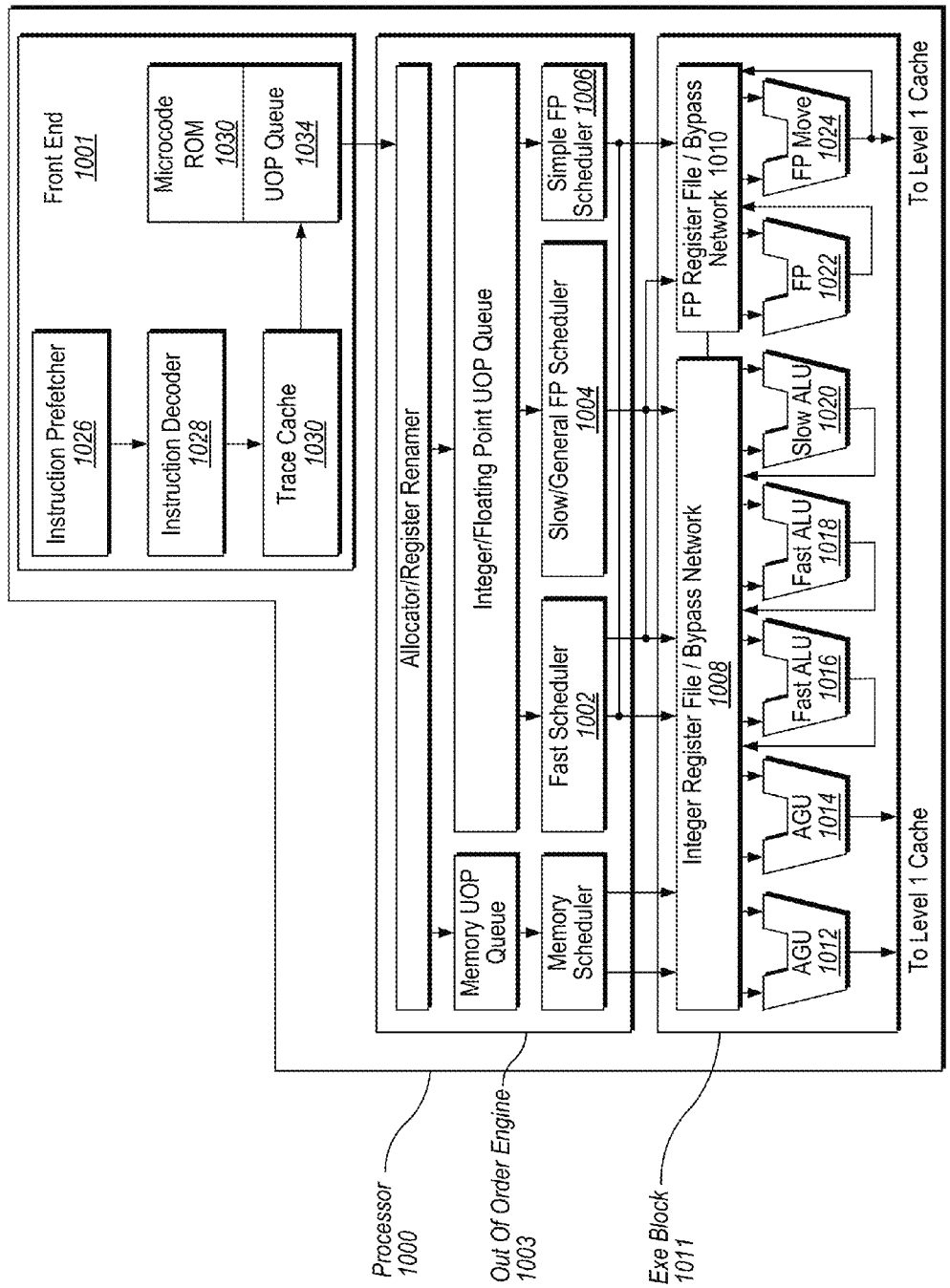
FIG. 10 illustrates a block diagram of the micro-architecture for a processor that includes the CATP logic, according to one embodiment.

FIG. 10 illustrates a block diagram of the micro-architecture for a processor 1000 that includes CATP logic 110, according to one embodiment. In one embodiment, processor 1000 is the multi-core processor 100 of FIG. 1A.

In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1001 is the part of the processor 1000 that fetches instructions to be executed and prepares them to be used later in the processor pipeline. The embodiments of the CATP logic 110 can be implemented in processor 1000.

The front end 1001 may include several units. In one embodiment, the instruction prefetcher 1016 fetches instructions from memory and feeds them to an instruction decoder 1018 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1030 takes decoded uops and assembles them into program ordered sequences or traces in the uop queue 1034 for execution. When the trace cache 1030 encounters a complex instruction, the microcode ROM 1032 provides the uops needed to complete the operation.

Some instructions are converted into a single micro-op, whereas others need several micro-ops to complete the full operation. In one embodiment, if more than four micro-ops are needed to complete an instruction, the decoder 1018 accesses the microcode ROM 1032 to do the instruction. For one embodiment, an instruction can be decoded into a small number of micro ops for processing at the instruction decoder 1018. In another embodiment, an instruction can be stored within the microcode ROM 1032 should a number of micro-ops be needed to accomplish the operation. The trace cache 1030 refers to an entry point programmable logic array (PLA) to determine a correct micro-instruction pointer for reading the micro-code sequences to complete one or more instructions in accordance with one embodiment from the micro-code ROM 1032. After the microcode ROM 1032 finishes sequencing micro-ops for an instruction, the front end 1001 of the machine resumes fetching micro-ops from the trace cache 1030.

The out-of-order execution engine 1003 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1002, slow/general floating point scheduler 1004, and simple floating point scheduler 1006. The uop schedulers 1002, 1004, 1006, determine when a uop is ready to execute based on the readiness of their dependent input register operand sources and the availability of the execution resources the uops need to complete their operation. The fast scheduler 1002 of one embodiment can schedule on each half of the main clock cycle while the other schedulers can only schedule once per main processor clock cycle. The schedulers arbitrate for the dispatch ports to schedule uops for execution.

Register files 1008, 1010, sit between the schedulers 1002, 1004, 1006, and the execution units 1012, 1014, 1016, 1018, 1020, 1022, 1024 in the execution block 1011. There is a separate register file 1008, 1010, for integer and floating point operations, respectively. Each register file 1008, 1010, of one embodiment also includes a bypass network that can bypass or forward just completed results that have not yet been written into the register file to new dependent uops. The integer register file 1008 and the floating point register file 1010 are also capable of communicating data with the other. For one embodiment, the integer register file 1008 is split into two separate register files, one register file for the low order 32 bits of data and a second register file for the high order 32 bits of data. The floating point register file 1010 of one embodiment has 128 bit wide entries because floating point instructions typically have operands from 64 to 128 bits in width.

The execution block 1011 contains the execution units 1012, 1014, 1016, 1018, 1020, 1022, 1024, where the instructions are actually executed. This section includes the register files 1008, 1010, that store the integer and floating point data operand values that the micro-instructions need to execute. The processor 1000 of one embodiment is included of a number of execution units: address generation unit (AGU) 1012, AGU 1014, fast ALU 1016, fast ALU 1018, slow ALU 1020, floating point ALU 1022, floating point move unit 1024. For one embodiment, the floating point execution blocks 1022, 1024, execute floating point, MMX, SIMD, and SSE, or other operations. The floating point ALU 1022 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1016, 1018. The fast ALUs 1016, 1018, of one embodiment can execute fast operations with an effective latency of half a clock cycle. For one embodiment, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1012, 1014. For one embodiment, the integer ALUs 1016, 1018, 1020, are described in the context of performing integer operations on 64 bit data operands. In alternative embodiments, the ALUs 1016, 1018, 1020, can be implemented to support a variety of data bits including 16, 32, 128, 256, etc. Similarly, the floating point units 1022, 1024, can be implemented to support a range of operands having bits of various widths. For one embodiment, the floating point units 1022, 1024, can operate on 128 bits wide packed data operands in conjunction with SIMD and multimedia instructions.

In one embodiment, the uops schedulers 1002, 1004, 1006, dispatch dependent operations before the parent load has finished executing. As uops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 1000 also includes logic to implement prioritization according to one embodiment. In one embodiment, the execution block 1011 of processor 1000 may include CATP logic 110, to perform demand request and prefetch request prioritization according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX™ registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 11:
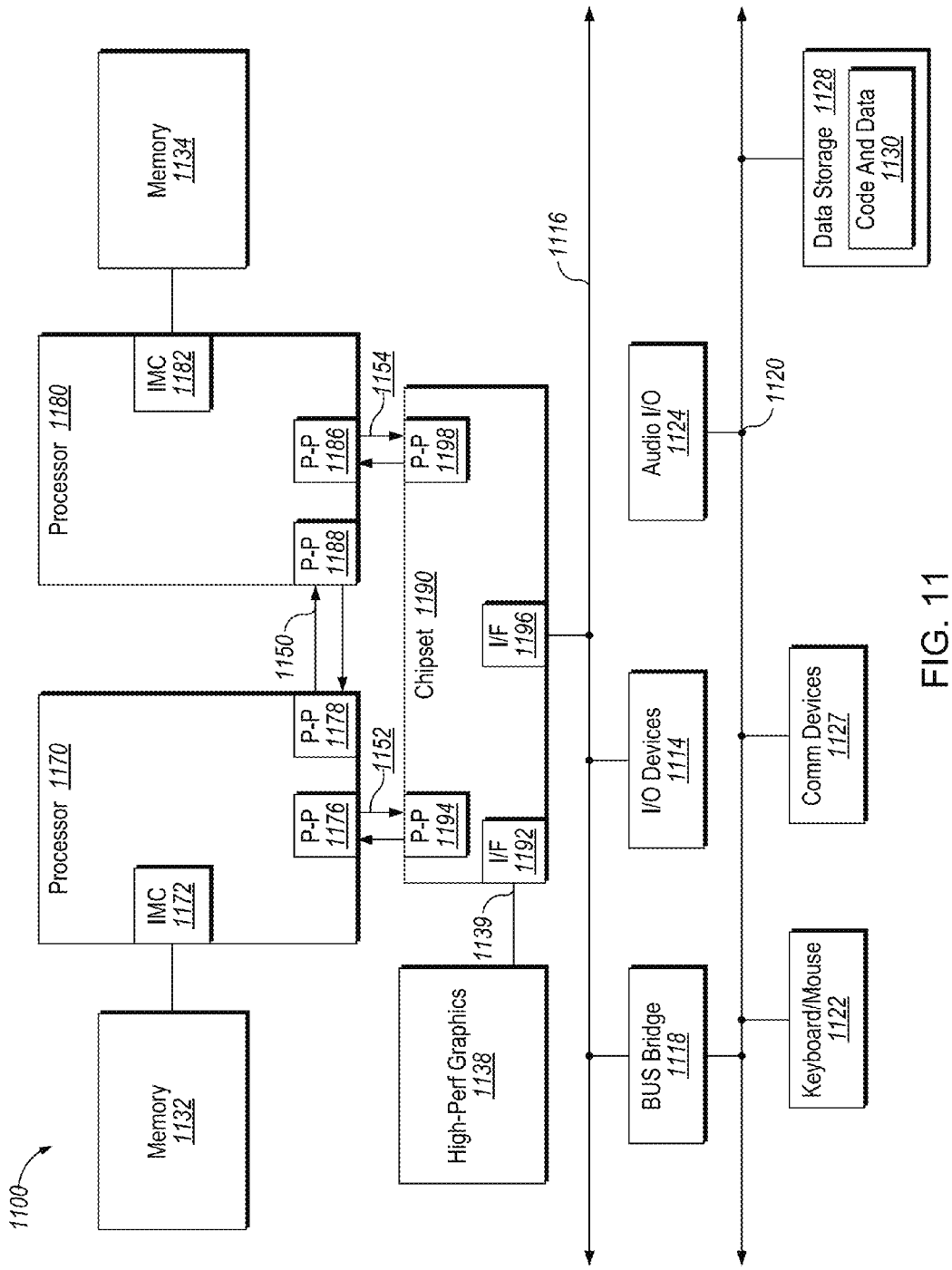
FIG. 11 is a block diagram of a computer system according to one implementation.

Embodiments may be implemented in many different system types. Referring now to FIG. 11, shown is a block diagram of a multiprocessor system 1100 in accordance with an implementation. As shown in FIG. 11, multiprocessor system 1100 is a point-to-point interconnect system, and includes a first processor 1170 and a second processor 1180 coupled via a point-to-point interconnect 1150. As shown in FIG. 11, each of processors 1170 and 1180 may be multicore processors, including first and second processor cores (i.e., processor cores 1174a and 1174b and processor cores 1184a and 1184b), although potentially many more cores may be present in the processors. The processors each may include hybrid write mode logics in accordance with an embodiment of the present. The embodiments of the CATP logic 110 can be implemented in the processor 1170, processor 1180, or both.

While shown with two processors 1170, 1180, it is to be understood that the scope of the present disclosure is not so limited. In other implementations, one or more additional processors may be present in a given processor.

Processors 1170 and 1180 are shown including integrated memory controller units 1182 and 1182, respectively. Processor 1170 also includes as part of its bus controller units point-to-point (P-P) interfaces 1176 and 1188; similarly, second processor 1180 includes P-P interfaces 1186 and 1188. Processors 1170, 1180 may exchange information via a point-to-point (P-P) interface 1150 using P-P interface circuits 1188, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may also exchange information with a high-performance graphics circuit 1138 via a high-performance graphics interface 1139.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, second bus 1120 may be a low pin count (LPC) bus. Various devices may be coupled to second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to second bus 1120. Note that other architectures are possible. For example, instead of the point-to-point architecture of FIG. 11, a system may implement a multi-drop bus or other such architecture.

Figure 12:
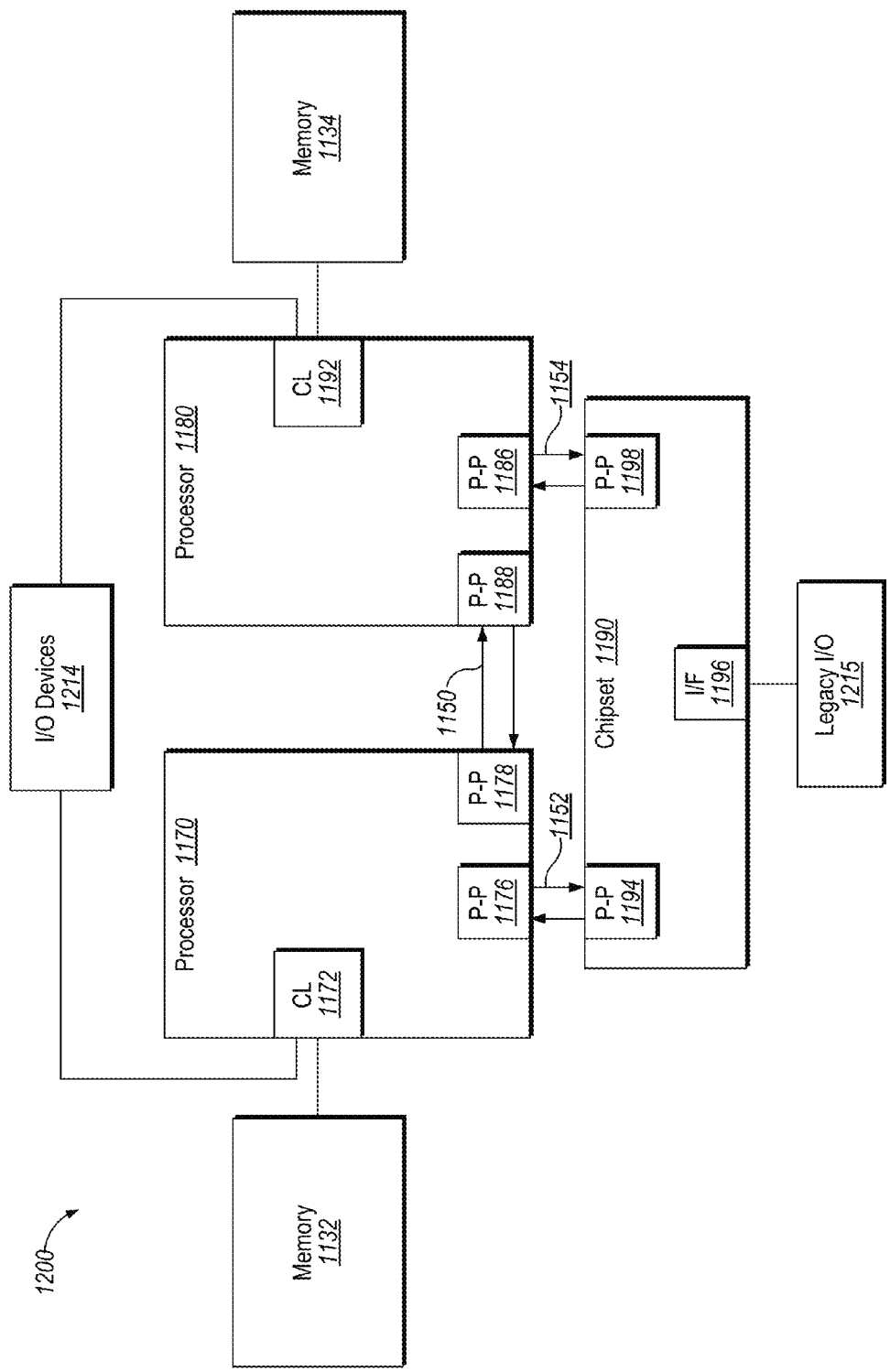
FIG. 12 is a block diagram of a computer system according to another implementation.

Referring now to FIG. 12, shown is a block diagram of a third system 1200 in accordance with an embodiment of the present disclosure. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. For at least one embodiment, the CL 1172, 1182 may include integrated memory controller units such as described herein. In addition, CL 1172, 1182 may also include I/O control logic. FIG. 12 illustrates that the memories 1132, 1134 are coupled to the CL 1172, 1182, and that I/O devices 1214 are also coupled to the control logic 1172, 1182. Legacy I/O devices 1215 are coupled to the chipset 1190. The embodiments of the CATP logic 110 can be implemented in processor 1170, processor 1180, or both.

Figure 13:
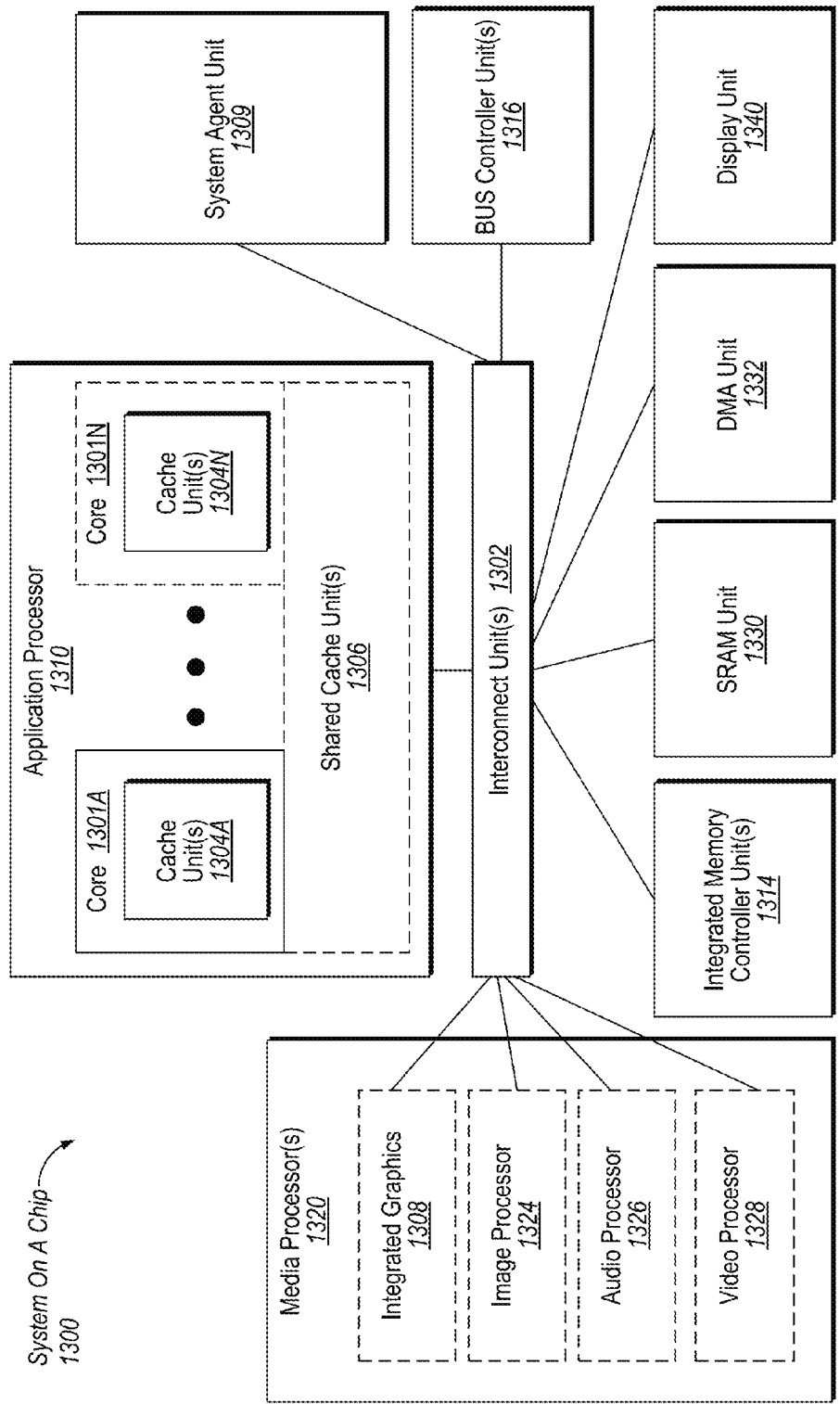
FIG. 13 is a block diagram of a system-on-a-chip according to one implementation.

FIG. 13 is an exemplary system on a chip (SoC) that may include one or more of the cores 1301 (e.g., cores 100). Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 13, shown is a block diagram of a SoC 1300 in accordance with an embodiment of the present disclosure. Also, dashed lined boxes are features on more advanced SoCs. In FIG. 13, an interconnect unit(s) 1302 is coupled to: an application processor 1310 which includes a set of one or more cores 1301A-N and shared cache unit(s) 1306; a system agent unit 1309; a bus controller unit(s) 1316; an integrated memory controller unit(s) 1314; a set or one or more media processors 1320 which may include integrated graphics logic 1308, an image processor 1324 for providing still and/or video camera functionality, an audio processor 1326 for providing hardware audio acceleration, and a video processor 1328 for providing video encode/decode acceleration; a static random access memory (SRAM) unit 1330; a direct memory access (DMA) unit 1332; and a display unit 1340 for coupling to one or more external displays. The embodiments of the pages additions and content copying can be implemented in SoC 1300.

Figure 14:
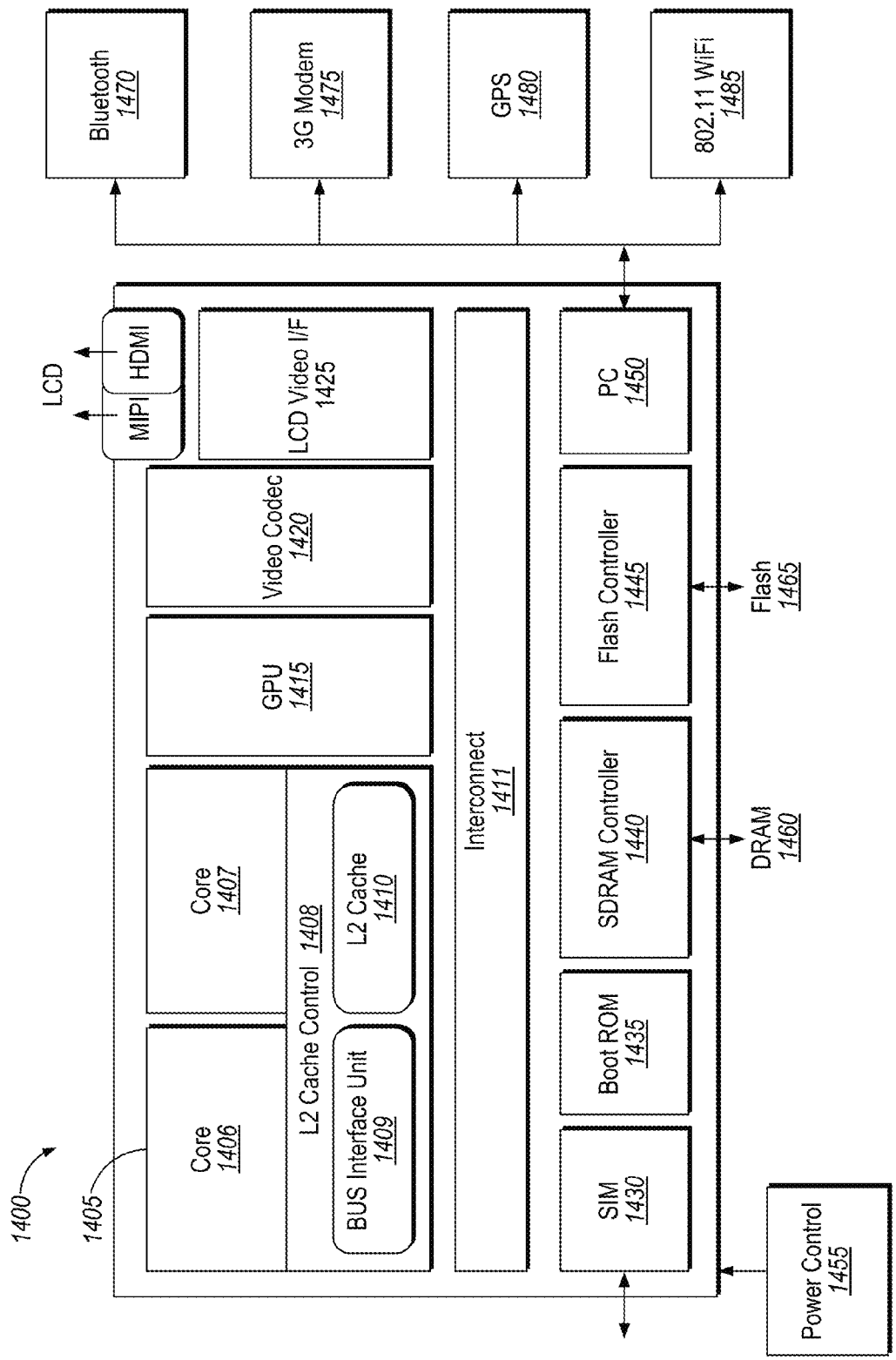
FIG. 14 illustrates another implementation of a block diagram for a computing system.

Turning next to FIG. 14, an embodiment of a system on-chip (SoC) design in accordance with embodiments of the disclosure is depicted. As an illustrative example, SoC 1400 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the CATP logic 110 can be implemented in SoC 1400.

Here, SoC 1400 includes 2 cores—1406 and 1407. Similar to the discussion above, cores 1406 and 1407 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1406 and 1407 are coupled to cache control 1408 that is associated with bus interface unit 1409 and L2 cache 1410 to communicate with other parts of system 1400. Interconnect 1411 includes an on-chip interconnect, such as an IOSF, AMBA, or other interconnects discussed above, which can implement one or more aspects of the described disclosure.

Interconnect 1411 provides communication channels to the other components, such as a Subscriber Identity Module (SIM) 1430 to interface with a SIM card, a boot ROM 1435 to hold boot code for execution by cores 1406 and 1407 to initialize and boot SoC 1400, a SDRAM controller 1440 to interface with external memory (e.g. DRAM 1460), a flash controller 1445 to interface with non-volatile memory (e.g. Flash 1465), a peripheral control 1450 (e.g. Serial Peripheral Interface) to interface with peripherals, video codecs 1420 and Video interface 1425 to display and receive input (e.g. touch enabled input), GPU 1415 to perform graphics related computations, etc. Any of these interfaces may incorporate aspects of the embodiments described herein.

In addition, the system illustrates peripherals for communication, such as a Bluetooth module 1470, 3G modem 1475, GPS 1480, and Wi-Fi 1485. Note as stated above, a UE includes a radio for communication. As a result, these peripheral communication modules may not all be included. However, in a UE some form of a radio for external communication should be included.

Figure 15:
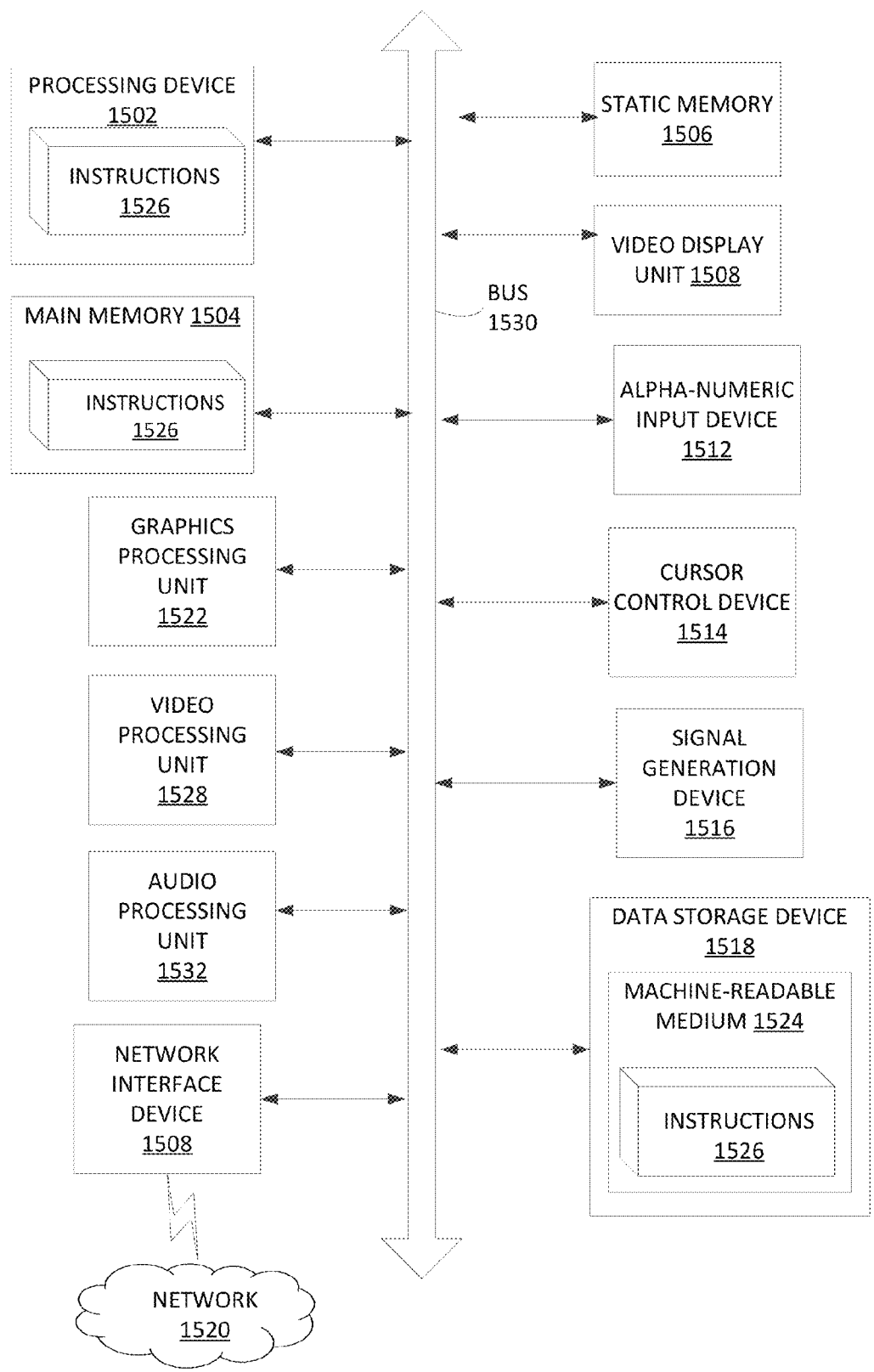
FIG. 15 illustrates another implementation of a block diagram for a computing system.

FIG. 15 illustrates a diagrammatic representation of a machine in the example form of a computing system 1500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the CATP logic 110 can be implemented in computing system 1500.

The computing system 1500 includes a processing device 1502, main memory 1504 (e.g., read-only memory (ROM), flash memory, dynamic random access memory (DRAM) (such as synchronous DRAM (SDRAM) or DRAM (RDRAM), etc.), a static memory 1506 (e.g., flash memory, static random access memory (SRAM), etc.), and a data storage device 1518, which communicate with each other via a bus 1530.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. In one embodiment, processing device 1502 may include one or processor cores. The processing device 1502 is configured to execute the instructions 1526 (e.g., processing logic) for performing the operations discussed herein. In one embodiment, processing device 1502 can include the CATP logic 110 of FIG. 1A. In another embodiment, processing device 1502 is multi-core processor 100 of FIG. 1A. Alternatively, the computing system 1500 can include other components as described herein. It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

The computing system 1500 may further include a network interface device 1508 communicably coupled to a network 1520. The computing system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a signal generation device 1516 (e.g., a speaker), or other peripheral devices. Furthermore, computing system 1500 may include a graphics processing unit 1522, a video processing unit 1528 and an audio processing unit 1532. In another embodiment, the computing system 1500 may include a chipset (not illustrated), which refers to a group of integrated circuits, or chips, that are designed to work with the processing device 1502 and controls communications between the processing device 1502 and external devices. For example, the chipset may be a set of chips on a motherboard that links the processing device 1502 to very high-speed devices, such as main memory 1504 and graphic controllers, as well as linking the processing device 1502 to lower-speed peripheral buses of peripherals, such as USB, PCI or ISA buses.

The data storage device 1518 may include a computer-readable storage medium 1524 on which is stored instructions 1526 (e.g., software) embodying any one or more of the methodologies of functions described herein. The instructions 1526 (e.g., software) may also reside, completely or at least partially, within the main memory 1504 as instructions 1526 and/or within the processing device 1502 as processing logic during execution thereof by the computing system 1500; the main memory 1504 and the processing device 1502 also constituting computer-readable storage media.

The computer-readable storage medium 1524 may also be used to store instructions 1526 utilizing the processing device 1502 and/or a software library containing methods that call the above applications. While the computer-readable storage medium 1524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a multi-core processor comprising: a plurality of cores to execute a plurality of threads and to monitor metrics for each of the plurality of threads during an interval, the metrics comprising stall cycle values, a first number of prefetches of a first type, and a second number of prefetches of a second type; and criticality-aware thread prioritization (CATP) logic to: compute a stall fraction for each of the plurality of threads during the interval using the stall cycle values; identify a thread from the plurality of threads with a highest stall fraction of the plurality of threads; determine the highest stall fraction is greater than a stall threshold; prioritize demand requests of the identified thread; compute a prefetch accuracy of the identified thread during the interval using the first number of prefetches of the first type and the second number of prefetches of the second type; determine the prefetch accuracy is greater than a prefetch threshold; and prioritize prefetch requests of the identified thread.

In Example 2, the multi-core processor of Example 1, wherein the CATP logic comprises: first logic block to compute the stall fraction; second logic block to compute the prefetch accuracy; third logic block to prioritize the demand requests of the identified thread; and fourth logic block to prioritize the prefetch requests of the identified thread.

In Example 3, the multi-core processor of any one of Examples 1-2, wherein the first logic block and the second logic block reside in each of the plurality of cores.

In Example 4, the multi-core processor of any one of Examples 1-3 further comprising a memory controller, wherein the first logic block and the second logic block reside in each of the plurality of cores, wherein the third logic block and the fourth logic block reside in the memory controller.

In Example 5, the multi-core processor of any one of Examples 1-4 further comprising a memory controller, wherein the first logic block, the second logic block, the third logic block, and the fourth logic block reside in the memory controller.

In Example 6, the multi-core processor of any one of Examples 1-5, wherein: the prefetch accuracy is a ratio of the first number of prefetches of the first type to a sum of the first number of prefetches of the first type and the second number of prefetches of the second type; prefetches of the first type is when corresponding data was brought into an L2 cache from main memory and the corresponding data was used by a subsequent demand request; and prefetches of the second type is when corresponding data was brought into the L2 cache from the main memory and the corresponding data was evicted without being used.

In Example 7, the multi-core processor of any one of Examples 1-6, wherein the stall fraction of a corresponding thread is a ratio of the stall cycles of the corresponding thread to a plurality of stall cycles of the plurality of threads.

In Example 8, the multi-core processor of any one of Examples 1-7, wherein the CATP logic to prioritize the demand requests of the identified thread comprises processing the demand requests of the identified thread prior to processing a plurality of demand requests from the plurality of threads, wherein the CATP logic to prioritize the prefetch requests of the identified thread comprises processing the prefetch requests of the identified thread after processing the demand requests of the identified thread and prior to processing a plurality of prefetch requests from the plurality of threads.

Example 9 is a method comprising: executing, by a plurality of cores, a plurality of threads; monitoring, by the plurality of cores, metrics for each of the plurality of threads during an interval, the metrics comprising stall cycle values, a first number of prefetches of a first type, and a second number of prefetches of a second type; and computing, by a first logic block of criticality-aware thread prioritization (CATP) logic, a stall fraction for each of the plurality of threads during the interval using the stall cycle values; identifying, by the CATP logic, a thread from the plurality of threads with a highest stall fraction of the plurality of threads; determining, by the CATP logic, the highest stall fraction is greater than a stall threshold; prioritizing, by a third logic block of the CATP logic, demand requests of the identified thread; computing, by a second logic block of the CATP logic, a prefetch accuracy of the identified thread during the interval using the first number of prefetches of the first type and the second number of prefetches of the second type; determining, by the CATP logic, the prefetch accuracy is greater than a prefetch threshold; and prioritizing, by a fourth logic block of the CATP logic, prefetch requests of the identified thread.

In Example 10, the method of Example 9, wherein the first logic block and the second logic block reside in each of the plurality of cores.

In Example 11, the method of any one of Examples 9-10, wherein the first logic block and the second logic block reside in each of the plurality of cores, wherein the third logic block and the fourth logic block reside in a memory controller.

In Example 12, the method of any one of Examples 9-11, wherein the first logic block, the second logic block, the third logic block, and the fourth logic block reside in a memory controller.

In Example 13, the method of any one of Examples 9-12, wherein: the prefetch accuracy is a ratio of the first number of prefetches of the first type to a sum of the first number of prefetches of the first type and the second number of prefetches of the second type; prefetches of the first type is when corresponding data was brought into an L2 cache from main memory and the corresponding data was used by a subsequent demand request; and prefetches of the second type is when corresponding data was brought into the L2 cache from the main memory and the corresponding data was evicted without being used.

In Example 14, the method of any one of Examples 9-13, wherein the stall fraction of a corresponding thread is a ratio of the stall cycles of the corresponding thread to a plurality of stall cycles of the plurality of threads.

In Example 15, the method of any one of Examples 9-14, wherein: the prioritizing of the demand requests of the identified thread comprises processing the demand requests of the identified thread prior to processing a plurality of demand requests from the plurality of threads; and the prioritizing of the prefetch requests of the identified thread comprises processing the prefetch requests of the identified thread after processing the demand requests of the identified thread and prior to processing a plurality of prefetch requests from the plurality of threads.

Example 16 is an apparatus comprising means to perform a method of any one of Examples 9-15.

Example 17 is at least one machine readable medium comprising a plurality of instructions, when executed, to implement a method or realize an apparatus of any one of Examples 9-15.

Example 18 is an apparatus comprising means for performing the method of any one of Examples 9-15.

Example 19 is an apparatus comprising a processor configured to perform the method of any one of Examples 9-15.

Example 20 is a system comprising: a main memory to receive a plurality of demand requests and a plurality of prefetch requests from a plurality of threads; and a multi-core processor coupled to the main memory, the multi-core processor comprising: a plurality of cores to execute a plurality of threads and to monitor metrics for each of the plurality of threads during an interval, the metrics comprising stall cycle values, a first number of prefetches of a first type, and a second number of prefetches of a second type; and criticality-aware thread prioritization (CATP) logic to: compute, by a first logic block of the CATP logic, a stall fraction for each of the plurality of threads during the interval using the stall cycle values; identify a thread from the plurality of threads with a highest stall fraction of the plurality of threads; determine the highest stall fraction is greater than a stall threshold; prioritize, by a third logic block of the CATP logic, demand requests of the identified thread; compute, by a second logic block of the CATP logic, a prefetch accuracy of the identified thread during the interval using the first number of prefetches of the first type and the second number of prefetches of the second type; determine the prefetch accuracy is greater than a prefetch threshold; and prioritize, by a fourth logic block of the CATP logic, prefetch requests of the identified thread.

In Example 21, the system of Example 20, wherein the first logic block and the second logic block reside in each of the plurality of cores.

In Example 22, the system of any one of Examples 20-21 further comprising a memory controller, wherein the first logic block and the second logic block reside in each of the plurality of cores, wherein the third logic block and the fourth logic block reside in the memory controller.

In Example 23, the system of any one of Examples 20-22 further comprising a memory controller, wherein the first logic block, the second logic block, the third logic block, and the fourth logic block reside in the memory controller.

In Example 24, the system of any one of Examples 20-23, wherein: the prefetch accuracy is a ratio of the first number of prefetches of the first type to a sum of the first number of prefetches of the first type and the second number of prefetches of the second type; prefetches of the first type is when corresponding data was brought into an L2 cache from main memory and the corresponding data was used by a subsequent demand request; and prefetches of the second type is when corresponding data was brought into the L2 cache from the main memory and the corresponding data was evicted without being used.

In Example 25, the system of any one of Examples 20-24, wherein the CATP logic to prioritize the demand requests of the identified thread comprises processing the demand requests of the identified thread prior to processing a plurality of demand requests from the plurality of threads, wherein the CATP logic to prioritize the prefetch requests of the identified thread comprises processing the prefetch requests of the identified thread after processing the demand requests of the identified thread and prior to processing a plurality of prefetch requests from the plurality of threads.

In Example 26, the system of any one of Examples 20-25, wherein the stall fraction of a corresponding thread is a ratio of the stall cycles of the corresponding thread to a plurality of stall cycles of the plurality of threads.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A multi-core processor comprising:
  a plurality of cores to execute a plurality of threads and to monitor metrics for each of the plurality of threads during an interval, the metrics comprising stall cycle values, a first number of prefetches of a first type, and a second number of prefetches of a second type; and
  criticality-aware thread prioritization (CATP) logic to:
    compute a stall fraction for each of the plurality of threads during the interval using the stall cycle values;
    identify a thread from the plurality of threads with a highest stall fraction of the plurality of threads;
    determine the highest stall fraction is greater than a stall threshold;
    prioritize demand requests of the identified thread;
    compute a prefetch accuracy of the identified thread during the interval using the first number of prefetches of the first type and the second number of prefetches of the second type;
    determine the prefetch accuracy is greater than a prefetch threshold; and
    prioritize prefetch requests of the identified thread.

2. The multi-core processor of claim 1, wherein the CATP logic comprises:
  first logic block to compute the stall fraction;
  second logic block to compute the prefetch accuracy;
  third logic block to prioritize the demand requests of the identified thread; and
  fourth logic block to prioritize the prefetch requests of the identified thread.

3. The multi-core processor of claim 2, wherein the first logic block and the second logic block reside in each of the plurality of cores.

4. The multi-core processor of claim 2 further comprising a memory controller, wherein the first logic block and the second logic block reside in each of the plurality of cores, wherein the third logic block and the fourth logic block reside in the memory controller.

5. The multi-core processor of claim 2 further comprising a memory controller, wherein the first logic block, the second logic block, the third logic block, and the fourth logic block reside in the memory controller.

6. The multi-core processor of claim 1, wherein:
  the prefetch accuracy is a ratio of the first number of prefetches of the first type to a sum of the first number of prefetches of the first type and the second number of prefetches of the second type;
  prefetches of the first type is when corresponding data was brought into an L2 cache from main memory and the corresponding data was used by a subsequent demand request; and
  prefetches of the second type is when corresponding data was brought into the L2 cache from the main memory and the corresponding data was evicted without being used.

7. The multi-core processor of claim 1, wherein the stall fraction of a corresponding thread is a ratio of the stall cycles of the corresponding thread to a plurality of stall cycles of the plurality of threads.

8. The multi-core processor of claim 1, wherein the CATP logic to prioritize the demand requests of the identified thread comprises processing the demand requests of the identified thread prior to processing a plurality of demand requests from the plurality of threads, wherein the CATP logic to prioritize the prefetch requests of the identified thread comprises processing the prefetch requests of the identified thread after processing the demand requests of the identified thread and prior to processing a plurality of prefetch requests from the plurality of threads.

9. A method comprising:
  executing, by a plurality of cores, a plurality of threads;
  monitoring, by the plurality of cores, metrics for each of the plurality of threads during an interval, the metrics comprising stall cycle values, a first number of prefetches of a first type, and a second number of prefetches of a second type; and
  computing, by a first logic block of criticality-aware thread prioritization (CATP) logic, a stall fraction for each of the plurality of threads during the interval using the stall cycle values;
  identifying, by the CATP logic, a thread from the plurality of threads with a highest stall fraction of the plurality of threads;
  determining, by the CATP logic, the highest stall fraction is greater than a stall threshold;
  prioritizing, by a third logic block of the CATP logic, demand requests of the identified thread;
  computing, by a second logic block of the CATP logic, a prefetch accuracy of the identified thread during the interval using the first number of prefetches of the first type and the second number of prefetches of the second type;
  determining, by the CATP logic, the prefetch accuracy is greater than a prefetch threshold; and prioritizing, by a fourth logic block of the CATP logic, prefetch requests of the identified thread.

10. The method of claim 9, wherein the first logic block and the second logic block reside in each of the plurality of cores.

11. The method of claim 9, wherein the first logic block and the second logic block reside in each of the plurality of cores, wherein the third logic block and the fourth logic block reside in a memory controller.

12. The method of claim 9, wherein the first logic block, the second logic block, the third logic block, and the fourth logic block reside in a memory controller.

13. The method of claim 9, wherein:
the prefetch accuracy is a ratio of the first number of prefetches of the first type to a sum of the first number of prefetches of the first type and the second number of prefetches of the second type;
prefetches of the first type is when corresponding data was brought into an L2 cache from main memory and the corresponding data was used by a subsequent demand request; and
prefetches of the second type is when corresponding data was brought into the L2 cache from the main memory and the corresponding data was evicted without being used.

14. The method of claim 9, wherein the stall fraction of a corresponding thread is a ratio of the stall cycles of the corresponding thread to a plurality of stall cycles of the plurality of threads.

15. The method of claim 9, wherein:
the prioritizing of the demand requests of the identified thread comprises processing the demand requests of the identified thread prior to processing a plurality of demand requests from the plurality of threads; and
the prioritizing of the prefetch requests of the identified thread comprises processing the prefetch requests of the identified thread after processing the demand requests of the identified thread and prior to processing a plurality of prefetch requests from the plurality of threads.

16. A system comprising:
a main memory to receive a plurality of demand requests and a plurality of prefetch requests from a plurality of threads; and
a multi-core processor coupled to the main memory, the multi-core processor comprising:
a plurality of cores to execute the plurality of threads and to monitor metrics for each of the plurality of threads during an interval, the metrics comprising stall cycle values, a first number of prefetches of a first type, and a second number of prefetches of a second type; and
criticality-aware thread prioritization (CATP) logic to:
compute, by a first logic block of the CATP logic, a stall fraction for each of the plurality of threads during the interval using the stall cycle values;
identify a thread from the plurality of threads with a highest stall fraction of the plurality of threads;
determine the highest stall fraction is greater than a stall threshold;
prioritize, by a third logic block of the CATP logic, demand requests of the identified thread;
compute, by a second logic block of the CATP logic, a prefetch accuracy of the identified thread during the interval using the first number of prefetches of the first type and the second number of prefetches of the second type;
determine the prefetch accuracy is greater than a prefetch threshold; and
prioritize, by a fourth logic block of the CATP logic, prefetch requests of the identified thread.

17. The system of claim 16, wherein the first logic block and the second logic block reside in each of the plurality of cores.

18. The system of claim 16 further comprising a memory controller, wherein the first logic block and the second logic block reside in each of the plurality of cores, wherein the third logic block and the fourth logic block reside in the memory controller.

19. The system of claim 16 further comprising a memory controller, wherein the first logic block, the second logic block, the third logic block, and the fourth logic block reside in the memory controller.

20. The system of claim 16, wherein:
the prefetch accuracy is a ratio of the first number of prefetches of the first type to a sum of the first number of prefetches of the first type and the second number of prefetches of the second type;
prefetches of the first type is when corresponding data was brought into an L2 cache from main memory and the corresponding data was used by a subsequent demand request; and
prefetches of the second type is when corresponding data was brought into the L2 cache from the main memory and the corresponding data was evicted without being used.

21. The system of claim 16, wherein the CATP logic to prioritize the demand requests of the identified thread comprises processing the demand requests of the identified thread prior to processing the plurality of demand requests from the plurality of threads, wherein the CATP logic to prioritize the prefetch requests of the identified thread comprises processing the prefetch requests of the identified thread after processing the demand requests of the identified thread and prior to processing the plurality of prefetch requests from the plurality of threads.

22. The system of claim 16, wherein the stall fraction of a corresponding thread is a ratio of the stall cycles of the corresponding thread to a plurality of stall cycles of the plurality of threads.

\* \* \* \* \*